US007824545B2

(12) United States Patent
Windmiller

(10) Patent No.: US 7,824,545 B2
(45) Date of Patent: Nov. 2, 2010

(54) BOTTOM FILLABLE BOTTLES AND SYSTEMS FOR CHARGING THE SAME

(76) Inventor: David Mitchell Windmiller, 18 Gwynne Rd., Melville, NY (US) 11747

(*) Notice: Subject to any disclaimer, the term of this patent is extended or adjusted under 35 U.S.C. 154(b) by 645 days.

(21) Appl. No.: 11/791,237

(22) PCT Filed: Nov. 21, 2005

(86) PCT No.: PCT/US2005/042051

§ 371 (c)(1),
(2), (4) Date: Oct. 18, 2007

(87) PCT Pub. No.: WO2006/055870

PCT Pub. Date: May 26, 2006

(65) Prior Publication Data

US 2008/0142421 A1 Jun. 19, 2008

Related U.S. Application Data

(60) Provisional application No. 60/630,011, filed on Nov. 21, 2004, provisional application No. 60/685,605, filed on May 27, 2005, provisional application No. 60/729,067, filed on Oct. 20, 2005.

(51) Int. Cl.
*B01D 17/12* (2006.01)

(52) U.S. Cl. ......................... 210/110; 141/18; 141/113; 210/137; 210/143; 210/149; 210/181; 210/184; 210/232; 210/257.1; 210/266; 210/314; 210/323.1; 210/335; 210/94; 222/25; 222/52; 222/146.1; 222/189.06; 222/189.08; 222/544; 222/545

(58) Field of Classification Search .................... 62/3.6, 62/3.64, 389, 3.2; 222/146.1, 146.6, 23, 222/25, 52, 189.06, 189.08, 544, 545; 210/103, 210/104, 109, 110, 134, 137, 143, 149, 175, 210/181–186, 232, 234, 257.1, 257.2, 258, 210/259, 264, 266, 295, 314–316, 335, 416.1, 210/323.1, 94; 141/18, 113
See application file for complete search history.

(56) References Cited

U.S. PATENT DOCUMENTS

| | | | |
|---|---|---|---|
| 2,064,584 | A | 12/1936 | Aronson |
| 2,937,795 | A | 5/1960 | Ciliberti |
| 3,325,031 | A | 6/1967 | Singier |

(Continued)

OTHER PUBLICATIONS

Intl. Search Report for application No. PCT/US05/42043, dated Mar. 14, 2006; 2 pages.

(Continued)

*Primary Examiner*—Joseph W Drodge
(74) *Attorney, Agent, or Firm*—Carter, DeLuca, Farrell & Schmidt, LLP

(57) ABSTRACT

According to an aspect of the present disclosure, a fluid supply assembly fluidly connectable to a source of fluid is provided. The fluid supply assembly includes a housing (702); a hydraulic assembly (710) supported within the housing (702), wherein the hydraulic assembly (710) is configured and adapted to pressurize the fluid which is supplied to a solenoid shut-off valve (724); a tank assembly (714) supported within the housing (702) for retaining a quantity of pre-conditioned fluid therein; and a filter assembly (720) supported within the housing (702) and in fluid communication with the hydraulic assembly (710).

20 Claims, 30 Drawing Sheets

U.S. PATENT DOCUMENTS

| | | | | |
|---|---|---|---|---|
| 3,654,743 | A | | 4/1972 | McGeary |
| 3,718,165 | A | | 2/1973 | Grothoff |
| 3,904,079 | A | | 9/1975 | Kross |
| 3,930,598 | A | | 1/1976 | Slagle |
| 3,940,019 | A | | 2/1976 | Kross et al. |
| 3,993,218 | A | | 11/1976 | Reichenberger |
| 4,133,457 | A | | 1/1979 | Klassen |
| 4,142,651 | A | | 3/1979 | Leopoldi et al. |
| 4,162,028 | A | | 7/1979 | Reichenberger |
| 4,197,884 | A | | 4/1980 | Maran |
| 4,473,097 | A | | 9/1984 | Knickerbocker et al. |
| 4,481,986 | A | | 11/1984 | Meyers |
| RE32,142 | E | | 5/1986 | Meyers |
| 4,685,598 | A | | 8/1987 | Nezworski |
| 4,709,734 | A | | 12/1987 | Rudick et al. |
| 4,728,006 | A | | 3/1988 | Drobish et al. |
| 4,729,495 | A | | 3/1988 | Aschberger et al. |
| 4,752,389 | A | * | 6/1988 | Burrows ..................... 210/181 |
| 4,877,065 | A | | 10/1989 | Lamboy et al. |
| 4,938,387 | A | | 7/1990 | Kervefors et al. |
| 5,017,284 | A | * | 5/1991 | Miler et al. ................... 210/97 |
| 5,115,950 | A | | 5/1992 | Rohr |
| 5,167,819 | A | | 12/1992 | Iana et al. |
| 5,203,468 | A | | 4/1993 | Hsu |
| 5,213,236 | A | | 5/1993 | Brown et al. |
| 5,339,982 | A | | 8/1994 | Tardie |
| 5,339,995 | A | | 8/1994 | Brown et al. |
| 5,343,904 | A | | 9/1994 | Kaeser |
| 5,377,877 | A | | 1/1995 | Brown et al. |
| 5,388,620 | A | | 2/1995 | Lasserre et al. |
| 5,409,144 | A | | 4/1995 | Brown |
| 5,411,183 | A | | 5/1995 | Hildebrandt |
| 5,431,290 | A | | 7/1995 | Vinciguerra |
| 5,439,143 | A | | 8/1995 | Brown et al. |
| 5,484,080 | A | | 1/1996 | Blasnik et al. |
| 5,524,680 | A | | 6/1996 | DeLaforcade |
| 5,535,791 | A | | 7/1996 | Lisec |
| 5,545,315 | A | | 8/1996 | Lonneman |
| 5,573,142 | A | * | 11/1996 | Morellato et al. ........ 222/129.1 |
| 5,609,759 | A | | 3/1997 | Nohren, Jr. et al. |
| 5,632,892 | A | | 5/1997 | Klein |
| 5,743,443 | A | | 4/1998 | Hins |
| 5,817,231 | A | | 10/1998 | Souza |
| 5,839,614 | A | | 11/1998 | Brown |
| 5,919,365 | A | | 7/1999 | Collette |
| 5,927,566 | A | | 7/1999 | Mueller |
| 5,971,225 | A | | 10/1999 | Kapsa |
| 6,001,244 | A | * | 12/1999 | Salter et al. ................. 210/104 |
| 6,004,460 | A | | 12/1999 | Palmer et al. |
| 6,089,411 | A | | 7/2000 | Baudin et al. |
| 6,089,418 | A | | 7/2000 | Gaiser et al. |
| 6,095,381 | A | | 8/2000 | Schwanenberg |
| 6,117,319 | A | | 9/2000 | Cranshaw |
| 6,120,682 | A | | 9/2000 | Cook |
| 6,153,096 | A | | 11/2000 | Nonren, Jr. |
| 6,165,362 | A | | 12/2000 | Nohren, Jr. et al. |
| 6,206,058 | B1 | | 3/2001 | Nagel et al. |
| 6,230,940 | B1 | | 5/2001 | Manning et al. |
| 6,293,437 | B1 | | 9/2001 | Socier et al. |
| 6,344,146 | B1 | | 2/2002 | Moorehead et al. |
| 6,367,668 | B1 | | 4/2002 | Schwanenberg |
| H2027 | H | | 6/2002 | Brown et al. |
| 6,405,901 | B1 | | 6/2002 | Schantz et al. |
| 6,427,730 | B2 | | 8/2002 | Nagel et al. |
| 6,427,874 | B2 | | 8/2002 | Brown et al. |
| 6,468,435 | B1 | | 10/2002 | Hughes et al. |
| 6,491,069 | B2 | | 12/2002 | Nagel et al. |
| 6,494,346 | B2 | | 12/2002 | Gross et al. |
| 6,508,070 | B1 | * | 1/2003 | Palmer ........................ 62/201 |
| 6,530,504 | B2 | | 3/2003 | Socier |
| 6,569,329 | B1 | | 5/2003 | Nohren, Jr. |
| 6,607,012 | B2 | | 8/2003 | Yquel |
| 6,607,013 | B1 | | 8/2003 | Leoni |
| 6,684,915 | B1 | | 2/2004 | Ver Hage |
| 6,779,435 | B1 | | 8/2004 | Iacobucci |
| 6,919,025 | B2 | | 7/2005 | Cluff et al. |
| 2002/0134801 | A1 | | 9/2002 | Stewart |
| 2003/0085232 | A1 | | 5/2003 | Leinenweber |
| 2005/0145570 | A1 | * | 7/2005 | Pipes ......................... 210/652 |
| 2009/0145839 | A1 | | 6/2009 | Miga, Jr. |

OTHER PUBLICATIONS

Intl. Search Report for application No. PCT/US05/42041, dated Mar. 9, 2006; 2 pages.

Intl. Search Report for application No. PCT/US05/42042, dated Mar. 8, 2006; 2 pages.

Intl. Search Report for application No. PCT/US05/42051, dated Mar. 22, 2006; 4 pages.

* cited by examiner

BOTTOM FILLABLE BOTTLES AND SYSTEMS FOR CHARGING THE SAME

CROSS-REFERENCE TO RELATED APPLICATIONS

The present application is a Continuation Application which claims the benefit of and priority to International Application Ser. No. PCT/US2005/042051, filed on Nov. 21, 2005, which in turn claims the benefit of and priority to each of U.S. Provisional Application Ser. No. 60/630,011, filed Nov. 21, 2004; U.S. Provisional Application Ser. No. 60/685,605, filed May 27, 2005; and U.S. Provisional Application Ser. No. 60/729,067, filed Oct. 20, 2005, the entire contents of each of which being incorporated herein by reference.

BACKGROUND

1. Technical Field

The present disclosure relates to fluid dispensers and containers and, more particularly, to bottles and the like which may be filled from the bottom thereof and to systems for charging the bottom fillable bottles with a fluid or the like.

2. Background of Related Art

Typically, bottles are filled with fluid through an opening formed near or at a top end thereof. The opening may then be closed with a cap which must first be removed in order to dispense the fluid from within the bottle, or closed with a dispensing cap which may be selectively opened in order to dispense the fluid from within the bottle without the dispensing cap being removed therefrom. The dispensing cap facilitates and expedites access to the fluid and dispensing of the fluid from the bottle.

However, the process of filling and closing the bottle is still relatively slow and inefficient. In order to fill the bottle, the cap must be removed, the bottle filled with the fluid, and the cap replaced on the bottle to close the bottle and prevent loss of the fluid therefrom.

A need exists for bottles which may be quickly and easily filled or charged with fluid, with or without removing a cap therefrom.

A need also exists for systems for charging and/or recharging empty or spent bottles with fluid in a facile and efficient manner.

SUMMARY

The present disclosure relates to fluid supply systems for charging bottom fillable bottles with a fluid or the like.

According to an aspect of the present disclosure, a fluid supply assembly fluidly connectable to a source of fluid is provided. The fluid supply assembly includes a housing; a hydraulic assembly supported within the housing, wherein the hydraulic assembly is configured and adapted to pressurize the fluid which is supplied to the fluid supply valve assembly; a tank assembly supported within the housing for retaining a quantity of pre-conditioned fluid therein; and a filter assembly supported within the housing and in fluid communication with the hydraulic assembly.

The hydraulic assembly may include a support body; a solenoid shut-off operatively disposed on the support body; a pressure regulator operatively associated with the solenoid shut-off; and a fluid supply line fluidly connected to the pressure regulator.

The fluid supply assembly may further include a solenoid filter in fluid communication with the solenoid shut-off. The fluid supply assembly may further include a fan plate assembly operatively associated with the tank assembly and being configured and adapted for maintaining the pre-conditioned fluid contained therein at a relatively low temperature.

The tank assembly may include an insulated housing defining a reservoir therein; and a screen disposed within the reservoir for dividing the reservoir into a first chamber and a second chamber. The tank assembly may further include first heat sinks extending into at least one of the first and second chambers of the reservoir; second heat sinks provided on an exterior of the insulated housing; and peltiers interconnecting the first and second heat sinks within one another. The tank assembly may include a fan plate assembly operatively associated with the second heat sinks.

The filter assembly may include a filter housing; a sediment filter disposed within the filter housing; and a carbon-block filter disposed within the housing.

The fluid supply assembly may further include a display supported on the housing thereof, the display including a plurality of LEDs, and a printed circuit board operatively associated with each LED.

It is contemplated that the sediment filter and the carbon-block filter may be replaceable. It is further contemplated that the sediment filter and the carbon-block filter may be automatically replaceable. The fluid supply assembly may include a mechanism for automatically replacing either of the sediment filter and the carbon-block filter.

It is envisioned that the filter assembly is replaceable.

The fluid supply assembly may further include a mounting bracket for connecting the housing of the fluid supply assembly to a supporting structure.

The fluid supply assembly may further include a mechanism for automatically replacing at least one of the sediment filter and the carbon-block filter. The automatic filter replacement mechanism may include a first button actuatable by a user for closing a fluid supply valve which supplies fluid to the filter assembly and for activating a release mechanism which disconnected at least one of the sediment filter and the carbon-block filter from the filter housing; and a second button actuatable by the user, following replacement of at least one of the sediment filter and the carbon-block filter with at least one new sediment filter and carbon-block filter, which fluidly secures the at least one new sediment filter and carbon-block filter to the filter housing, opens the fluid supply valve which supplies fluid to the filter assembly, and resets a counter which monitors use of the filter assembly and alerts the user when a predetermined threshold level is reached.

BRIEF DESCRIPTION OF THE DRAWINGS

The accompanying drawings, which are incorporated in and constitute a part of this specification, illustrate embodiments of the disclosure and, together with a general description of the disclosure given above and the detailed description of the embodiments given below, serve to explain the principles of the disclosure, wherein.

DETAILED DESCRIPTION OF THE EMBODIMENTS

Figure 3:
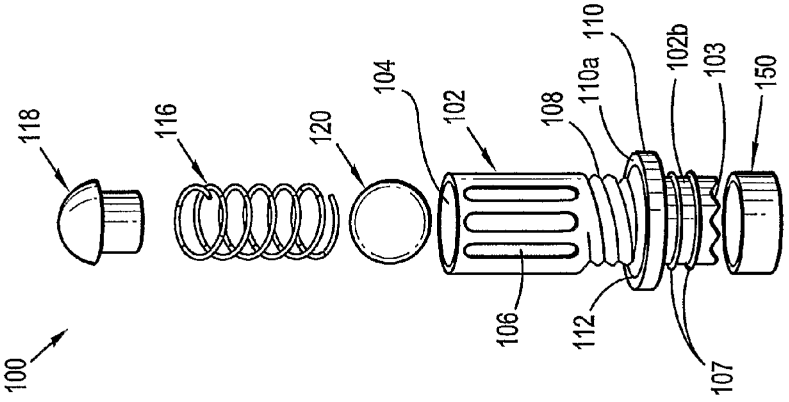
FIG. 3 is an exploded perspective view of the nipple assembly of FIGS. 1 and 2.

Embodiments of the presently disclosed fluid charging or recharging system will now be described in detail with reference to the drawing figures wherein like reference numerals identify similar or identical elements. As used herein and as is traditional, the term "distal" refers to that portion which is furthest from the user while the term "proximal" refers to that portion which is closest to the user.

Figure 1:
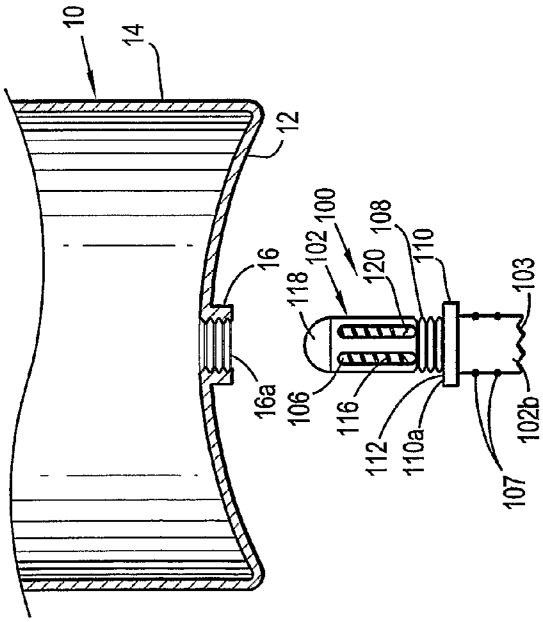
FIG. 1 is a longitudinal cross sectional view, with parts separated, of a portion of a bottle and nipple assembly of a charging system, in accordance with an embodiment of the present disclosure.
Figure 2:
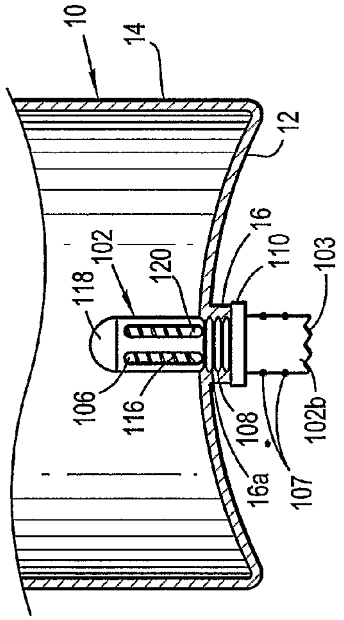
FIG. 2 is a longitudinal cross-sectional view of the portion of the bottle of FIG. 1, illustrating the nipple assembly connected to the bottle.
Figure 4:
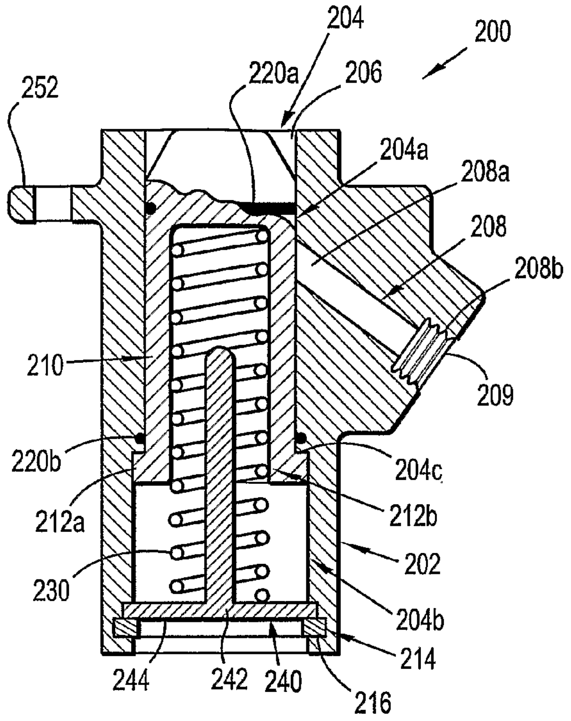
FIG. 4 is an exploded perspective view of a valve assembly of the charging system, in accordance with an embodiment of the present disclosure.
Figure 5:
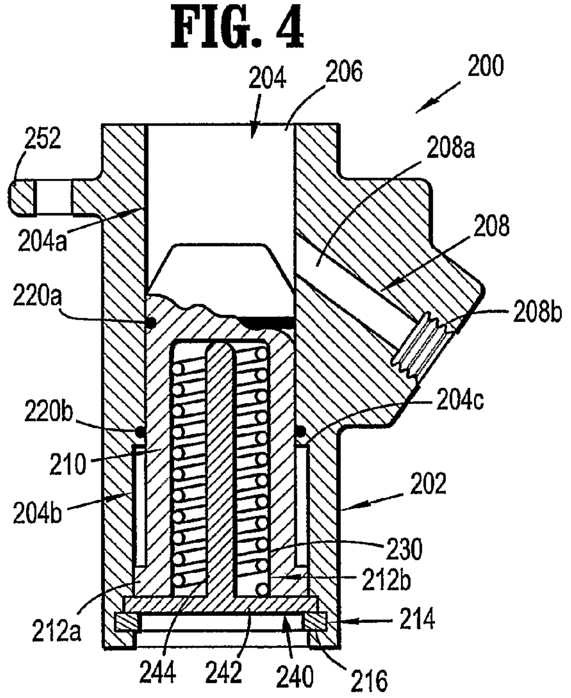
FIG. 5 is a longitudinal cross-sectional view of the valve assembly of FIG. 4 shown in an closed condition.
Figure 6:
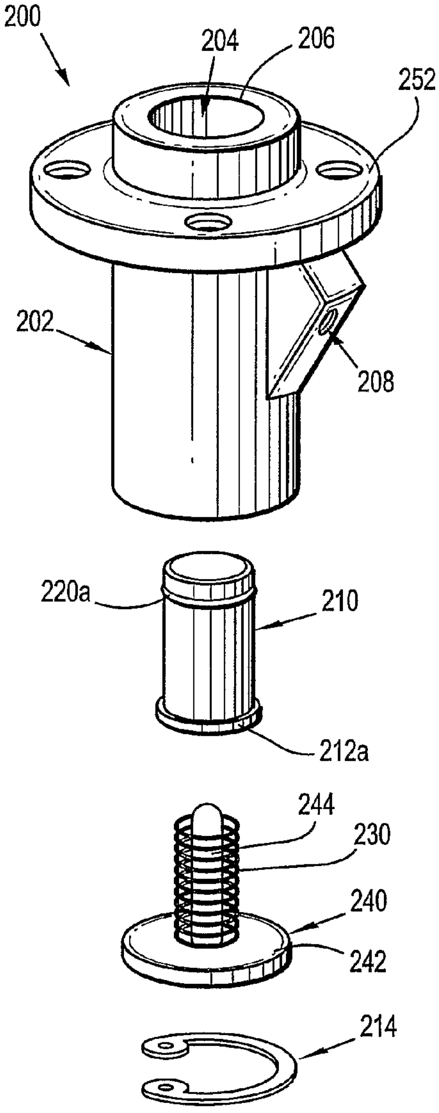
FIG. 6 is a longitudinal cross-sectional view of the valve assembly of FIGS. 4 and 5, shown in an open condition.

With reference to FIGS. 1-7, a charging or recharging system, in accordance with the present disclosure, is shown and described. The charging system includes a nipple assembly 100, as seen in FIGS. 1-3, and a valve assembly 200, as seen in FIGS. 4-6.

Referring now to FIGS. 1-3, a detailed discussion of nipple assembly 100 is provided. As seen in FIGS. 1-3, nipple assembly 100 is configured for selective attachment or connection to a bottle 10 or the like. Desirably, nipple assembly 100 is connected to and through a bottom surface 12 of bottle 10, however, it is envisioned and within the scope of the present disclosure that nipple assembly 100 may be connected to and through a side surface 14 of bottle 10. Nipple assembly 100 is connected to bottle 10 by connecting structure 108, here shown as a thread, which mates with complementary connecting structure 16*a* provided in a port 16 formed in bottom surface 12 of bottle 10. While connecting structures 108 and 16*a* are shown as threads, it is envisioned and within the scope of the present disclosure for the connecting structure to be any cooperating mating elements, such as, for example, bayonet-type connecting structure and the like. It is further envisioned that nipple assembly 100 may be fixedly secured to bottle 10, such as, for example, by welding, gluing and the like.

With continued reference to FIGS. 1-3, nipple assembly 100 includes a cylindrical body portion 102 defining a lumen 104 therethrough and at least one, preferably, a plurality of apertures 106 formed therearound. Body portion 102 includes connecting structure 108, desirably provided at a location proximal of apertures 106, for engaging connecting element 16*a* of port 16. Nipple assembly 100 includes an external flange 110 extending from body portion 102 which functions as a stop to prevent nipple assembly 100 from passing completely through port 16 and into bottle 10. A gasket or O-ring 112 may be positioned on a distal surface 110*a* of flange 110. Gasket 112 functions to create a fluid-tight seal between flange 110 of nipple assembly 100 and port 16 of bottle 10.

Nipple assembly 100 further includes a stopper 120, in the form of a sphere or ball, dimensioned to slidably sit within lumen 104 of body portion 102. Body portion 104 includes an internal flange or shoulder 114 (see FIG. 7) against which stopper 120 engages or contacts. Accordingly, in use, when stopper 120 is engaged against shoulder 114, lumen 104 of body portion 102 is closed, preventing passage of fluid therethrough. Additionally, when stopper 120 is spaced a distance from shoulder 114, lumen 104 of body portion is open, allowing for the passage of fluid therethrough. Stopper 120 is biased against shoulder 114 (i.e., to the closed condition) by a biasing member 116 (e.g., a compression spring or the like). Biasing member 116 is desirably positioned between stopper 120 and a plug or cap 118 connected to a distal end of body portion 102.

Desirably, a proximal end 102*b* of body portion 102 extends beyond external flange 112 to define a stem or the like. Stem 102*b* includes a series of undulations 103 formed around a proximal edge thereof. At least one gasket or O-ring 107 is provided around stem 102*b* in order to form a fluid-tight seal with valve assembly 200, as will be described in greater detail below.

Desirably, a cap 150 may be provided which snap-fits or friction fits onto stem 102*b* of nipple assembly 100.

Turning now to FIGS. 4-6, a detailed discussion of valve assembly 200 is provided. As seen in FIGS. 4-6, valve assembly 200 includes a body portion 202 defining a through-bore 204 therethrough. Through-bore 204 defines an open distal end 206. As seen in FIGS. 4 and 5, through-bore 204 includes a distal portion 204*a* having a first diameter and a proximal portion 204*b* having a second diameter, larger than the first diameter of distal portion 204*a*. A shoulder 204*c* is defined between distal portion 204*a* and proximal portion 204*b* of through-bore 204. Open distal end 206 is dimensioned to receive stem 102*b* of nipple assembly 100.

Body portion 202 further includes a channel or conduit 208 extending through a side thereof and in fluid communication with through-bore 204. Desirably, a distal end 208*a* of channel 208 is in close proximity to distal end 206 of through-bore 204. A proximal end 208*b* of channel 208 may include connecting structure 209 for connection with a free end of a fluid supply line "S" (see FIG. 7).

With continued reference to FIGS. 4-6, valve assembly 200 further includes a plunger 210 slidably disposed in through-bore 204 of body portion 202. Plunger 210 desirably includes an annular flange 212*a* extending radially outward therefrom which engages shoulder 204*c* of through-bore 204 and limits the distance plunger 210 travels in a distal direction. Desirably, valve assembly 200 includes a stop 214, in the form of a spring clamp or the like, selectively receivable in a complementary annular groove 216 formed in through-bore 204. Stop 214 limits the distance plunger 210 travels in a proximal direction.

Valve assembly 200 further includes a first gasket or O-ring 220*a* disposed in an annular groove formed in plunger 210. Desirably, first gasket 220*a* is positioned near a distal end of plunger 210. Valve assembly 200 includes a second gasket or O-ring 220*b* disposed in an annular groove formed in through-bore 204. Desirably, second gasket 220*b* is positioned distally of shoulder 204*c*. First and second gaskets 220*a*, 220*b* create a substantially fluid-tight seal between the outer surface of plunger 210 and the inner surface of through-bore 204.

As seen in FIG. 4, valve assembly 200 has a first or closed condition in which plunger 210 is positioned over distal end 208*a* of channel 208 and blocks or prevents fluid from flowing therefrom. Valve assembly 200 is in the closed condition when first gasket 220*a* of plunger 210 is positioned distally of distal end 208*a* of channel 208. Valve assembly 200 has a second or open condition in which plunger 210 is positioned proximally of distal end 208*a* of channel 208 to expose distal end 208*a* of channel 208 and permit fluid to flow from channel 208. Valve assembly 200 is in the open condition when first gasket 220*a* of plunger 210 is positioned proximally of distal end 208*a* of channel 208.

Desirably, plunger 210 is biased in such a manner so as to maintain valve assembly 200 in the closed condition. Any number of methods may be used to bias plunger 210 and thereby close valve assembly 200, such as, for example, pneumatic means, electrical means, and mechanical means. By way of example only, and in no way to be considered limiting, a biasing member 230, in the form of a compression spring, may be provided between a distally facing surface of body portion 202 of valve assembly 200 and a proximally facing surface of plunger 210. In particular, as seen in FIGS. 4-6, valve assembly 200 may include a guide member 240 having a plate 242 configured for seating in an annular shoulder 204*d* formed at a proximal end of through-bore 204, and a shaft 244 extending from plate 242 and into through-bore 204. Plunger 210 desirably includes a bore or recess 212*b* formed therein and extending substantially the entire length therethrough. Desirably, spring 230 is disposed about shaft 244 of guide member 240 and within bore 212*b* of plunger 210. Desirably, plate 242 of guide member 240 rests on stop 214.

Figure 7:
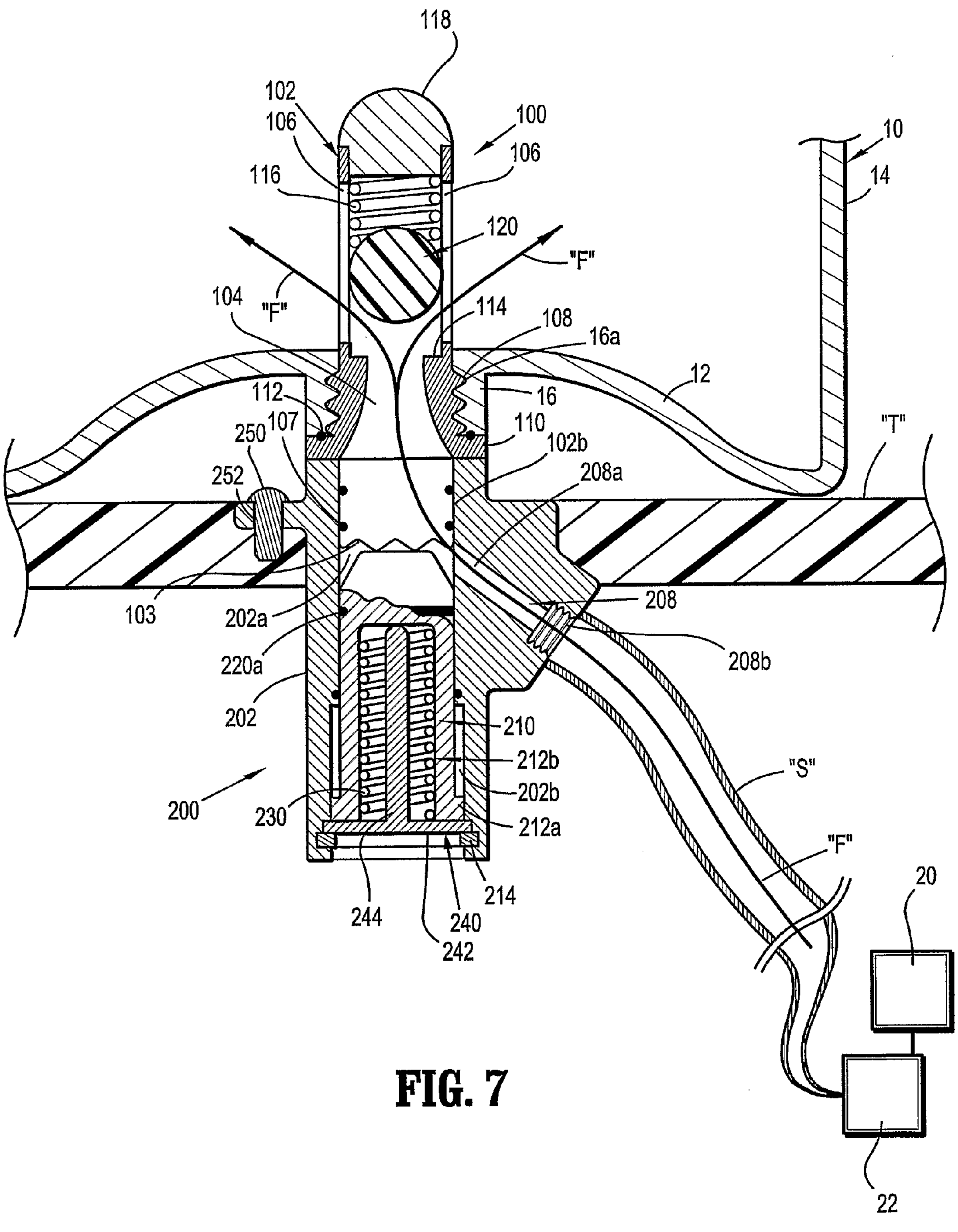
FIG. 7 is a longitudinal cross-sectional view, illustrating the connection of the bottle of FIGS. 1 and 2 to the valve assembly of FIGS. 4-6, in order to charge or recharge the bottle with a fluid.

Turning now to FIG. 7, a method of using the charging assembly of the present disclosure is shown and described. As seen in FIG. 7, valve assembly 200 may be mounted to surface or table top "T" by screws 250 extending through an annular flange 252 of body portion 202. Desirably, flange 252 of body portion is positioned such that a distal end 202*a* of body portion 202 extends above the surface of table top "T" and proximal end 208*b* of channel 208 is located below the surface of table top "T". A fluid supply line "S" is connected at a first end to channel 208 and at a second end to a source of fluid 20. Preferably, the source of fluid is under pressure.

Initially, valve assembly 200 is in the closed condition, wherein plunger 210 blocks or occludes channel 208 and prevents fluid "F" from being dispensed from valve assembly 200. An empty or substantially empty bottle 10 is then placed on valve assembly 200 such that stem 102*b* of body portion 102 of nipple assembly 100 is inserted into open distal end 206 of body portion 202 of valve assembly. As bottle 10 is placed on the surface of table top "T", stem 102*b* of nipple assembly 100 presses on plunger 210 of valve assembly 200 and urges or moves plunger 210, against the bias of spring 230, in a proximal direction. Desirably, as seen in FIG. 7, when bottle 10 is fully placed on valve assembly 200 (i.e., bottom surface 12 of bottle 10 rests on the top surface of table top "T"), stem 102*b* of nipple assembly 100 has displaced plunger 210 of valve assembly 200 by an amount sufficient to expose distal end 208*a* of channel 208, thereby opening valve assembly 200.

With plunger 210 depressed and distal end 208*a* of channel 208 exposed, fluid "F" flows through fluid supply line "S", through conduit 208 and into lumen 104 of body portion 102 of nipple assembly 100. In particular, fluid "F" enters lumen 104 through the spaces defined between undulations 103 of stem 102*b* and the surface of plunger 210 and exits lumen 104 through apertures 106 formed in body portion 102 of nipple assembly 100. Desirably, gaskets 107 create at least a substantially fluid-tight seal between the outer surface of stem 102*b* and the inner surface of through-bore 204.

As fluid "F" enters lumen 104, the force of the flow of fluid "F" moves stopper 120, against the bias of spring 116, in a distal direction thereby opening lumen 104 and allowing fluid "F" to enter and charge or recharge bottle 10. When the desired amount or volume of fluid "F" has been dispensed into bottle 10, bottle 10 is lifted off of valve assembly 200 and table top "T" to close valve assembly 200 and stop the flow of fluid "F" therefrom.

In particular, as bottle 10 is lifted off of table top "T" and, more particularly, valve assembly 200, stem 102*b* of nipple assembly 100 is withdrawn from through-bore 204 of body portion 202 of valve assembly 200. As stem 102*b* of nipple assembly 100 is withdrawn, the biasing force of spring 230, moves plunger 210 in a distal direction. Once first gasket 220*a* of plunger 210 crosses distal end 208*a* of channel 208, channel 208 is occluded (i.e., valve assembly 200 is closed) and fluid flow therethrough is stopped. Once the flow of fluid "F" is stopped the force of the flow of fluid "F", acting on stopper 120, is stopped and the biasing force of spring 116 moves stopper 120 into contact with shoulder 114 and closes lumen 104 of nipple assembly 100. With lumen 104 of nipple assembly 100 closed, fluid "F" is prevented from leaking or backing out of bottle 10.

When using the charging system of the present disclosure, bottle 10 must be vented. In other words, either an open container (i.e., the top of bottle 10 must be open or un-capped) or if the container is closed, the container must have an air vent or the like provided near an upper end thereof or the cap of the container must have an opening or be vented.

It is envisioned and within the scope of the present disclosure, that fluid "F" supplied by source 20 must first pass through a filter 22 or the like to thereby remove particles, impurities and/or contaminants.

Figure 8:
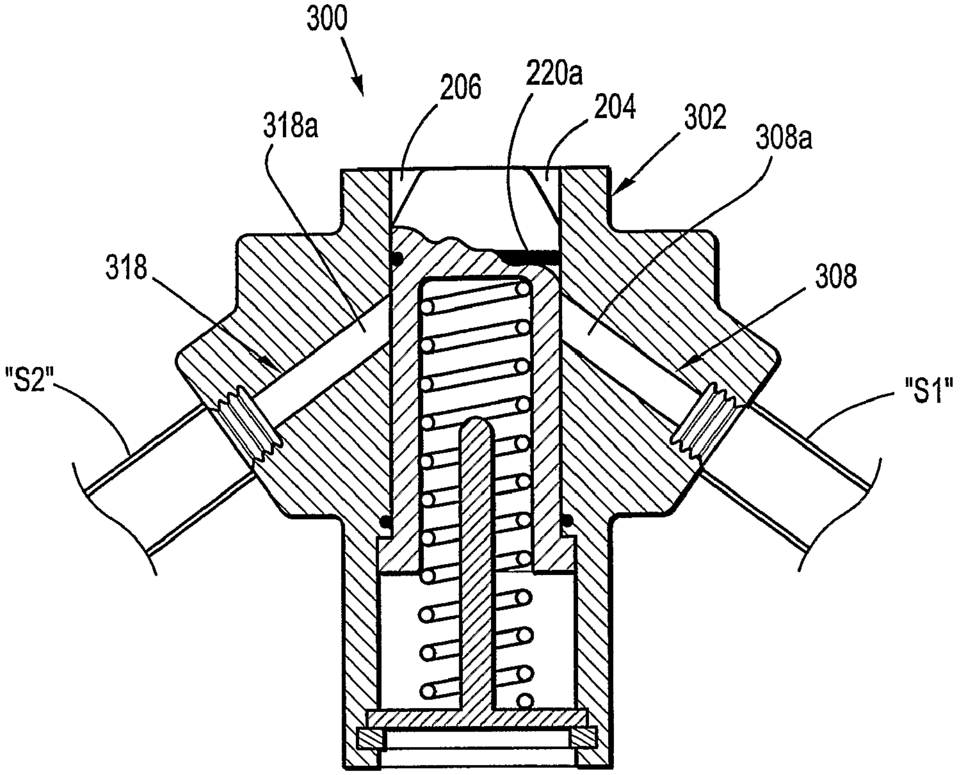
FIG. 8 is a longitudinal cross-sectional view of a valve assembly, according to an alternate embodiment of the present disclosure, shown in a closed condition.
Figure 9:
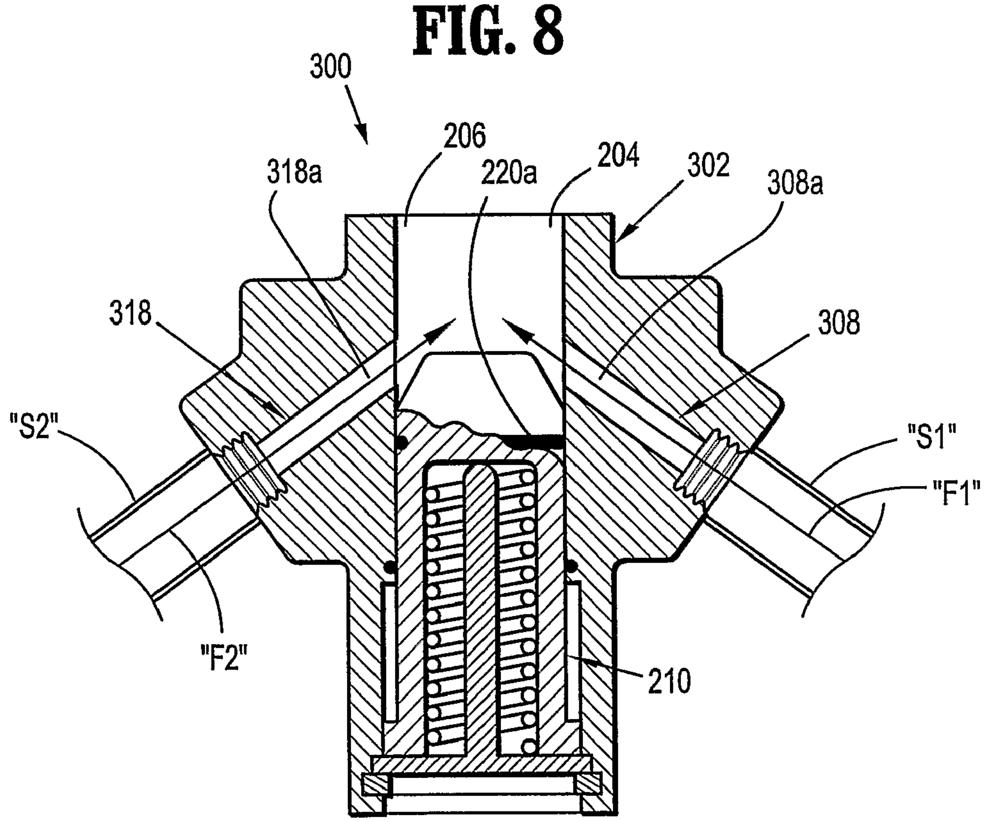
FIG. 9 is a longitudinal cross-sectional view of the valve assembly of FIG. 8, shown in an open condition.

Turning now to FIGS. 8 and 9, a valve assembly, in accordance with another embodiment of the present disclosure, is generally designated as 300. Valve assembly 300 is substantially similar to valve assembly 200 and will only be described in detail to the extent necessary to identify differences in construction and operation.

As seen in FIGS. 8 and 9, body portion 302 of valve assembly 300 includes a plurality of conduits or channels extending through a side thereof and in fluid communication with through-bore 204 thereof. For example, and in no way to be considered as limiting, valve assembly 300 includes a first conduit or channel 308 extending through a side of body portion 302 and in fluid communication with through-bore 204 thereof, and a second conduit or channel 318 extending through a side of body portion 302 and in fluid communication with through-bore 204 thereof. Desirably, first conduit 308 is spaced or offset a radial distance from second conduit 318.

In this manner, at least two separate fluid supply lines, for delivering two different fluids, may be connected to first and second conduits 308, 318. In particular, a first fluid supply line "S1" may be connected to first conduit 308 and a second fluid supply line "S2" may be connected to second conduit 318. Accordingly, during use, when valve assembly 300 is in an open condition, two fluids come together and mix with one another in through-bore 204 of valve assembly 300.

As seen in FIG. 8, valve assembly 300 has a first or closed condition in which plunger 210 is positioned over distal ends 308*a*, 318*a* of first and second conduits 308, 318, respectively, and blocks or prevents fluid from flowing therefrom. In particular, valve assembly 300 is in the closed condition when first gasket 220*a* of plunger 210 is positioned distally of distal ends 308*a*, 318*a* of first and second conduits 308, 318. Valve assembly 300 has a second or open condition in which plunger 210 is positioned proximally of distal ends 308*a*, 318*a* of first and second conduits 308, 318 to expose distal ends 308*a*, 318*a* of first and second conduits 308, 318 and permit a first fluid "F1" and a second fluid "F2" to flow from respective first and second conduits 308, 318. Valve assembly 300 is in the open condition when first gasket 220*a* of plunger 210 is positioned proximally of distal ends 308*a*, 318*a* of first and second conduits 308, 318.

When valve assembly 300 is in the open condition, first and second fluids "F1, F2" enter through-bore 204, are mixed together, and are forced out open distal end 206 of through-bore 204.

An exemplary use of valve assembly 300 is for the filling of bottle 10 with a soft drink or the like. The soft drink is mixed by valve assembly 300 wherein first fluid "F1" is carbonated water or seltzer, and second fluid "F2" is a syrup of a desired soft drink flavoring, for example, cola, root beer and the like. It is further envisioned that valve assembly 300 may be used for the mixing and dispensing of alcoholic or non-alcoholic mixed drinks, juices, sports drinks, other flavored beverages and the like. It is envisioned and within the scope of the present disclosure for the fluid to include and not be limited to water, carbonated water, juice, tea, milk, coffee, syrups (e.g., flavored syrups), alcohols, and the like.

Figure 10:
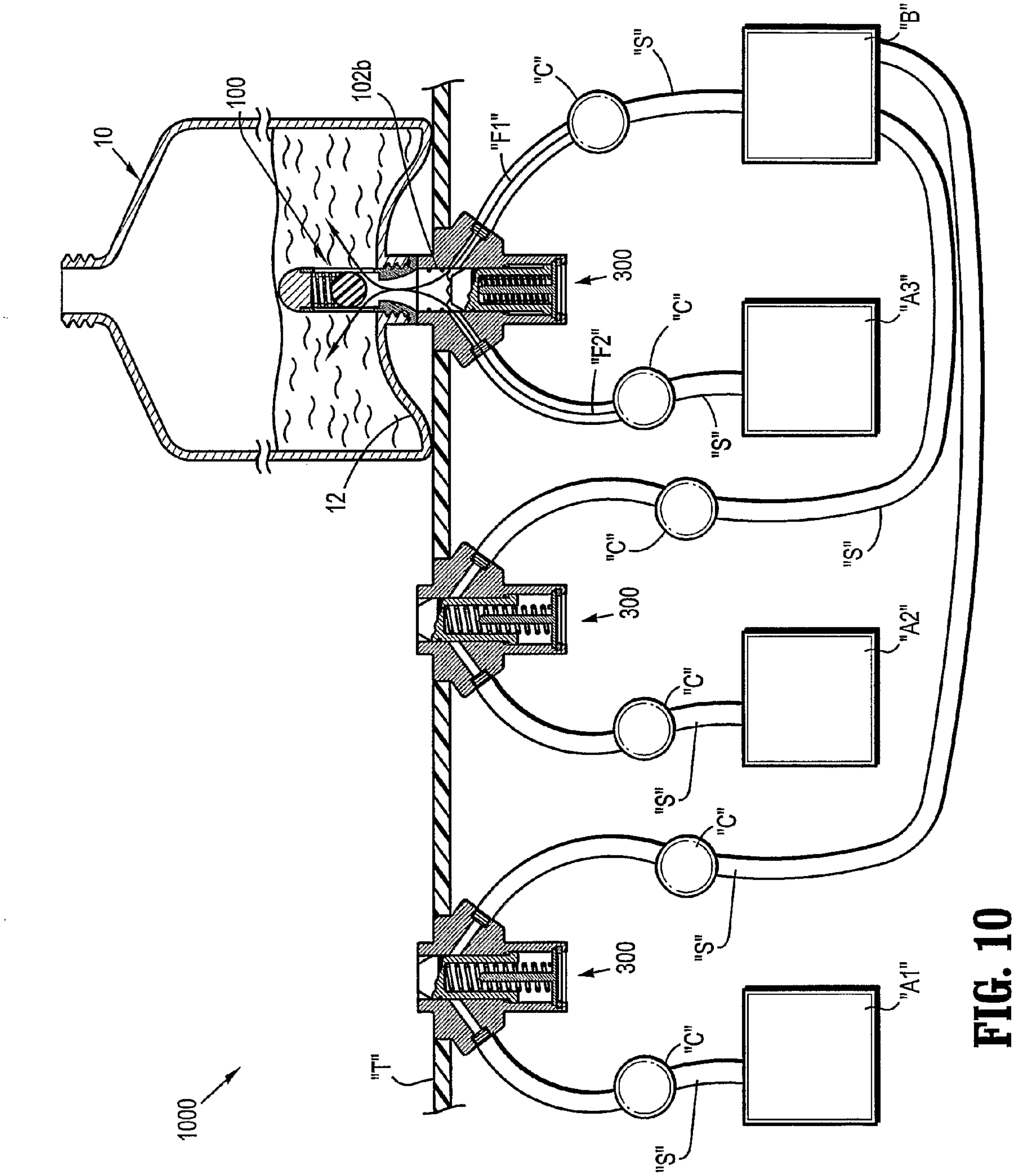
FIG. 10 is a schematic cross-sectional view of a charging/recharging system according to an embodiment of the present disclosure, illustrating the filling of a bottle with fluid.

Turning now to FIG. 10, a charging/recharging system, according to an embodiment of the present disclosure, is generally designated as 1000. Desirably, charging system 1000 includes a plurality of valve assemblies 300 mounted beneath a table top "T" or the like. Charging/recharging system 1000 further includes a nipple assembly 100 mounted to a bottom surface 12 of a bottle 10.

As seen in FIG. 10, each valve assembly 300 is fluidly connected to at least two sources of fluid. Desirably, each valve assembly 300 is fluidly connected to a discrete or unique source of fluid "A1-A3", and a common source of fluid "B". Valve assemblies 300 are connected to sources of fluid "A1-A3 and B" via fluid supply lines "S".

In FIG. 10, bottle 10 has been placed onto valve assembly 300 such that stem 102*b* of nipple assembly 100 is inserted into open distal end 206 (see FIG. 9) of valve assembly 300, as described in greater detail above. With stem 102*b* of nipple assembly 100 fluidly connected to valve assembly 300, a first fluid "F1", from common fluid source "B", is communicated to through-bore 204 (see FIG. 9) of valve assembly 300, and a second fluid "F2", from third fluid source "A3", is also communicated to through-bore 204. The combined or mixed fluid "F1 and F2" are then dispensed into bottle 10 in a manner as described above.

By way of example only, unique sources of fluid "A1-A3" may include syrups of differing flavors, such as, for example, cola, root beer, lemon-lime, orange, grape, cream, vanilla, cherry and the like. Meanwhile, common source of fluid "B" may include carbonated water, seltzer and the like. In this manner, bottle 10 may be filled with a desired soft drink by placing bottle 10 on the valve assembly associated with the desired soft drink flavor. It is further envisioned that bottle 10 may be filled with different combinations of soft drinks (e.g., cherry and vanilla, orange and vanilla, and the like).

In one embodiment, as seen in FIG. 10, charging/recharging system 1000 may include heat exchanging elements "C" (e.g., coolers or heaters) provided in each fluid supply line "S" to effect and/or alter the temperature of the fluid traveling therethrough. It is also envisioned that each source of fluid "A1-A3 and B" may be maintained in a climate controlled environment (e.g., a cooler or the like). In either manner, the fluid being dispensed by valve assembly 300 may be chilled prior to dispensing into bottles 10.

Turning now to FIGS. 11-28, a fluid dispensing system and method is shown and described for charging and/or re-charging bottles and the like. According to the present disclosure, there is provided a fluid dispensing system including a bottle assembly 500; a charging valve assembly 600 configured for selective operative fluid engagement with bottle assembly 500; and a supply assembly 700 fluidly connected to charging valve assembly 600 for supplying fluid to bottle assembly 500. Generally, during use, the fluid dispensing system will provide fluid (e.g., chilled, heated, filtered or the like) from supply assembly 700, through charging valve assembly 600, to bottle assembly 500 and the like. The fluid dispensing system provides a fast, convenient manner by which to fill bottles and the like with desired fluids.

Referring to FIGS. 11-18, a bottle assembly, fillable from the top or the bottom, in accordance with the present disclosure, is generally shown as 500. As will be described in greater detail below, bottle assembly 500 includes a removable check valve in a bottom thereof for interfacing with charging valve assembly 600, and a self-retracting drinking spout which opens and extends upward when a lever is actuated. Desirably, when the lever is released the drinking spout will fully retract into the cover.

As seen in FIGS. 11-18, bottle assembly 500 includes a vessel or body portion 502 defining a cavity 502*a* for receiving fluid therein. Bottle assembly 500 includes a cover assembly 510 removably securable to an upper end thereof via a threaded engagement.

Cover assembly 510 includes a lid member 512 configured and adapted to removably, selectively engage and cooperate with an upper rim 504*a* of body portion 502 of bottle assembly 500. Cover assembly 510 further includes a spout cover 514 operatively secured to lid member 512. Spout cover 514 includes an opening or window 514*a* through which a spout will project and/or extend.

Figure 11:
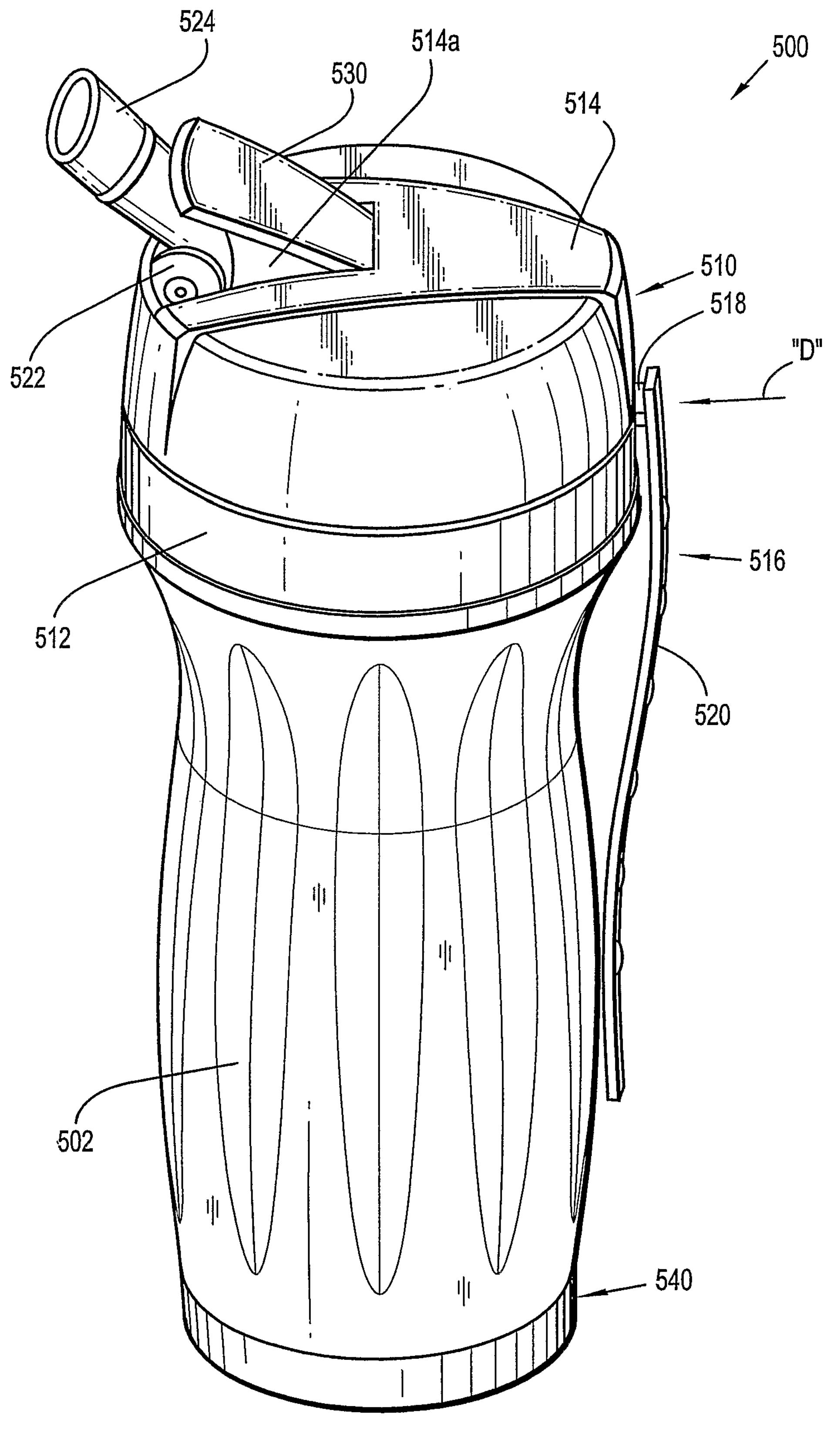
FIG. 11 is a perspective view of a bottom tillable bottle assembly in accordance with another embodiment of the present disclosure, illustrating the bottle assembly in an open condition.
Figure 12:
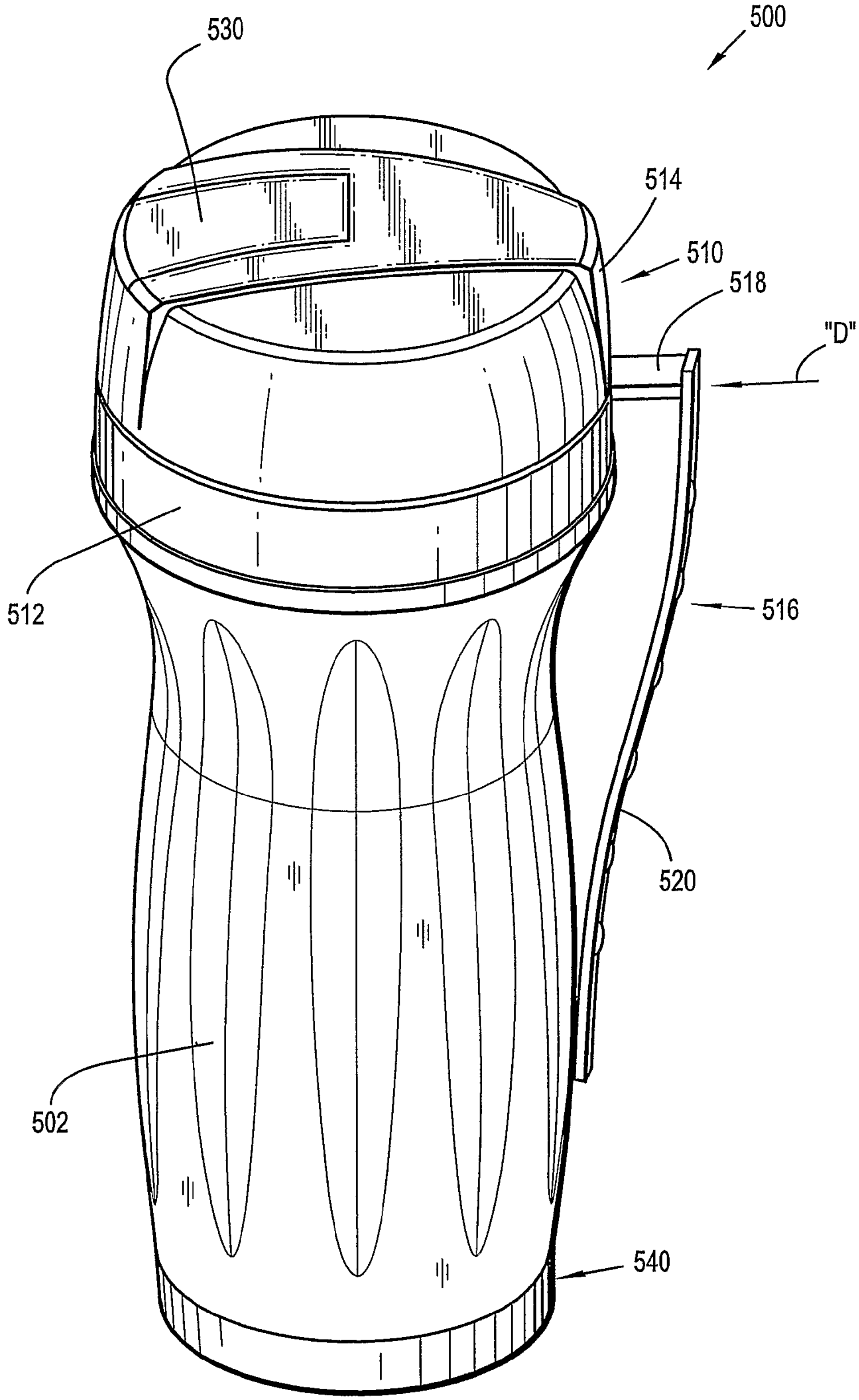
FIG. 12 is a perspective view of the bottle assembly of FIG. 11, shown in a closed condition.

Cover assembly 510 further includes a spout trigger or lever 516 operatively supported on lid member 512. Trigger 516 includes a slide arm 518 slidably supported in lid member 512 and a resilient leg 520 extending at an angle from slide arm 518 and configured and dimensioned to contact an outer surface of body portion 502 when cover assembly 510 is attached to body portion 502. As will be described in greater detail below, trigger 516 has a first or closed position (see FIG. 11), in which, a spout 524 is maintained in spout cover 514, and a second or opened position, in which, spout 524 projects or extends from an opening 514*a* in spout cover 514. In particular, when trigger 516 is in the first or closed position, as seen in FIG. 11, in order to deploy spout 524, trigger 516 is moved in the direction of arrow "D" (i.e., slide arm 518 is moved toward body portion 502) thereby biasing resilient leg 520 against body portion 502. When use of bottle assembly 500 is complete, in order to retract spout 524, trigger 516 is released and the bias of resilient leg 520 moves slide arm 518 in a direction opposite to arrow "D", thus retracting spout 524 into spout cover 514.

Figure 18:
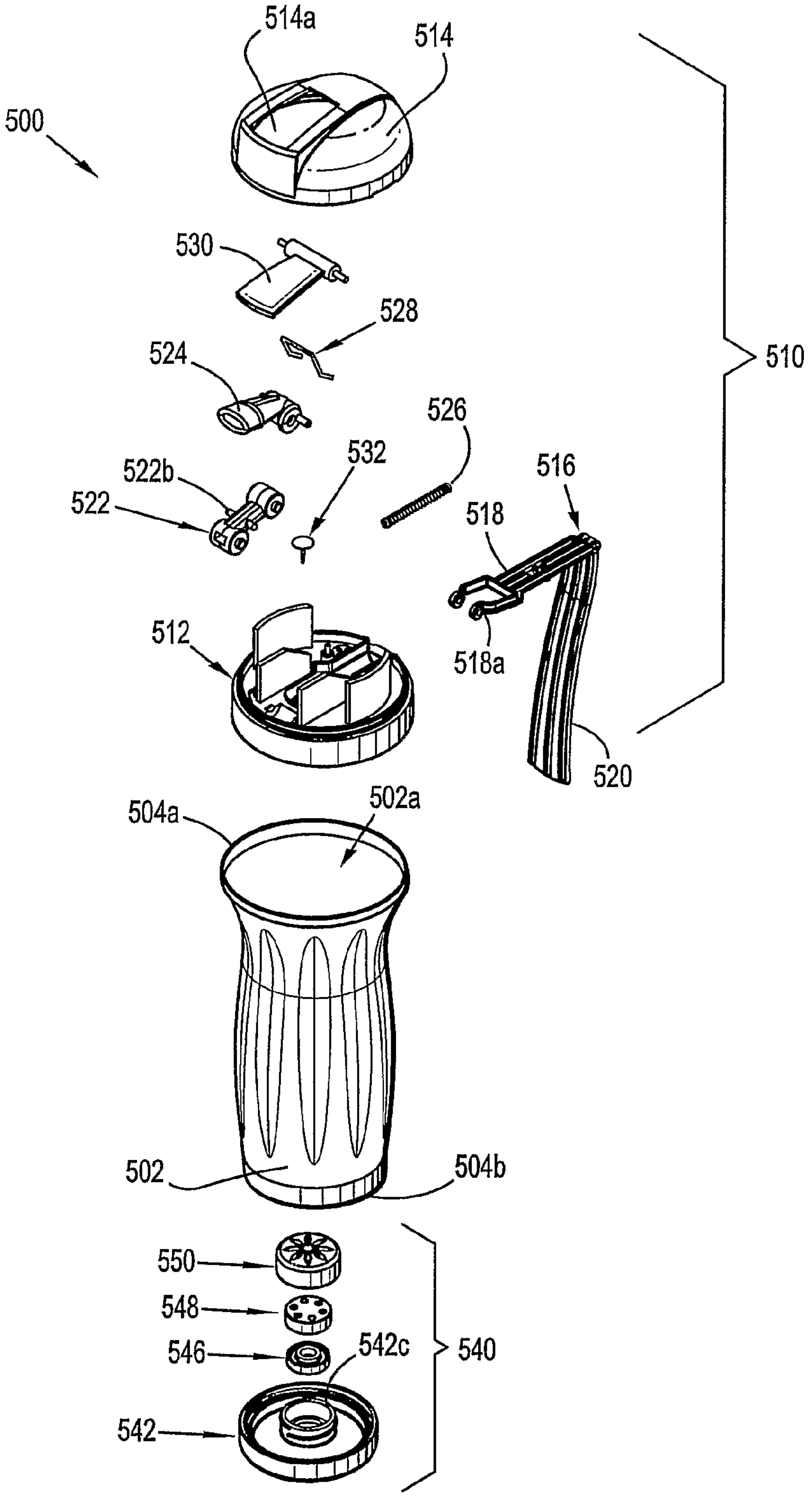
FIG. 18 is a perspective view, with parts separated, of the bottle assembly of FIGS. 11-17.
Figure 19:
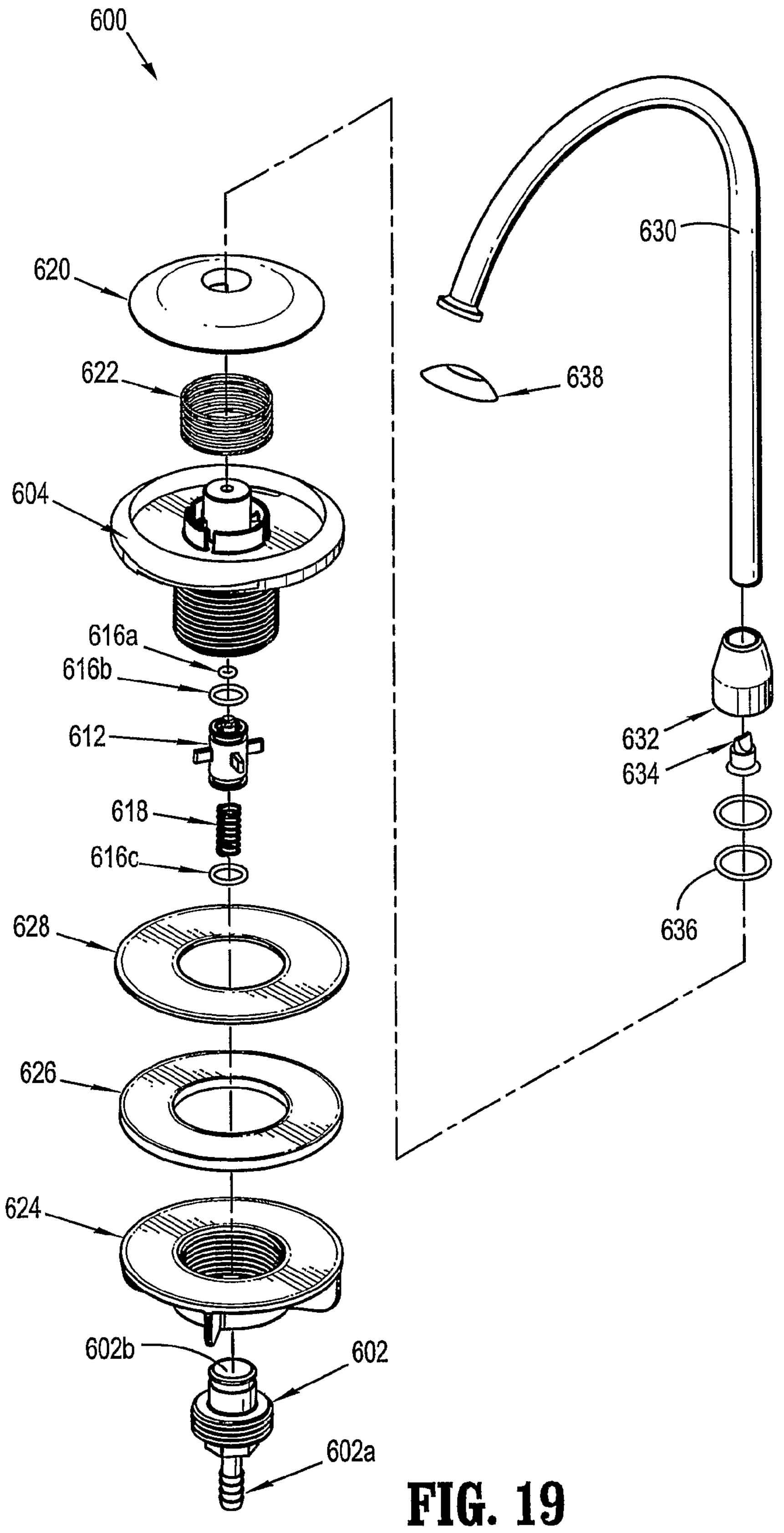
FIG. 19 is a perspective view, with parts separated, of a faucet assembly, in accordance with the present disclosure.
Figure 20:
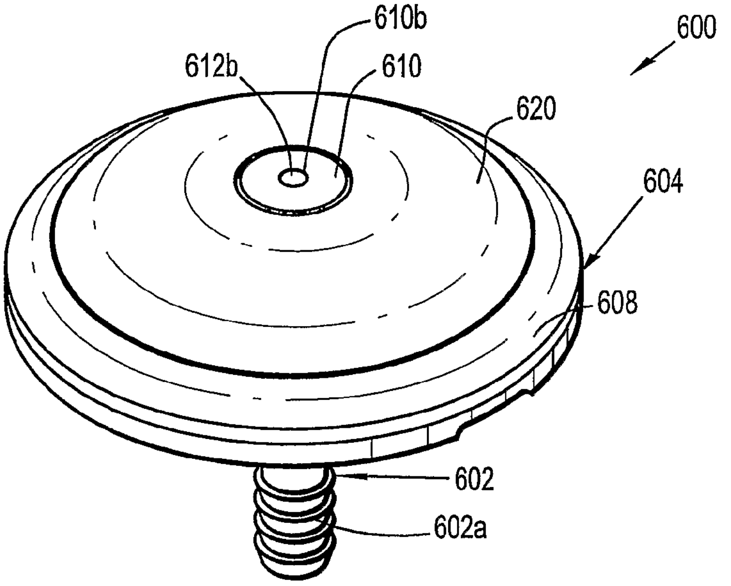
FIG. 20 is an enlarged perspective view of a charging valve assembly of the faucet assembly of FIG. 19.
Figure 21:
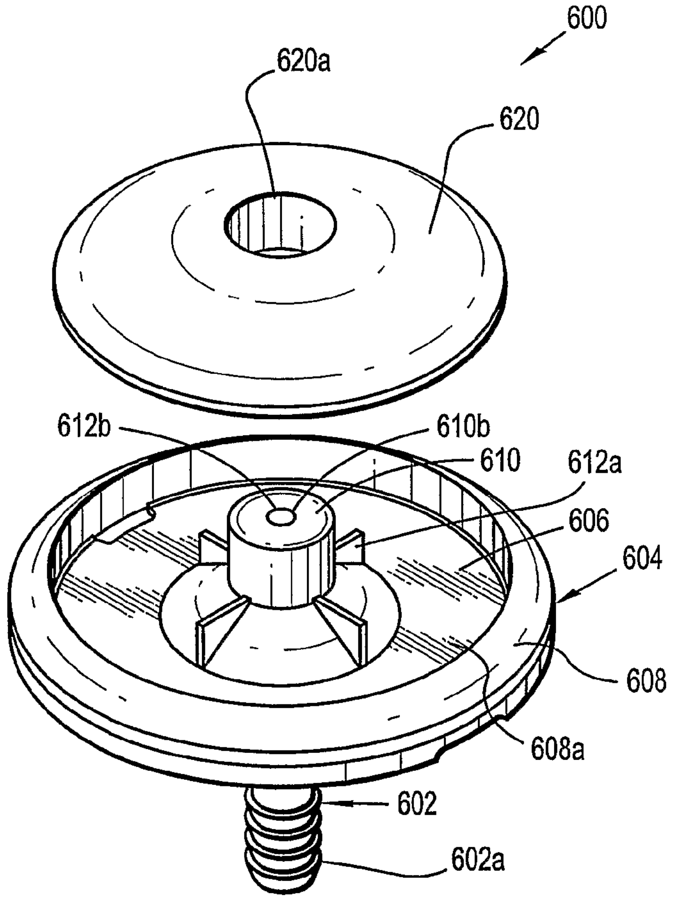
FIG. 21 is an enlarged perspective view, with parts separated, of the charging valve assembly of the faucet assembly of FIG. 19.

As seen in FIG. 18, a trigger spring 526 may be provided to bias slide arm 518 to the first position. Accordingly, as trigger 516 is manipulated from the first position to the second position, trigger spring 526 is compressed and/or biased. As such, upon release of trigger 516, trigger spring 526 un-compresses or un-biases (i.e., extends) to return trigger 516 to the first position.

Figure 13:
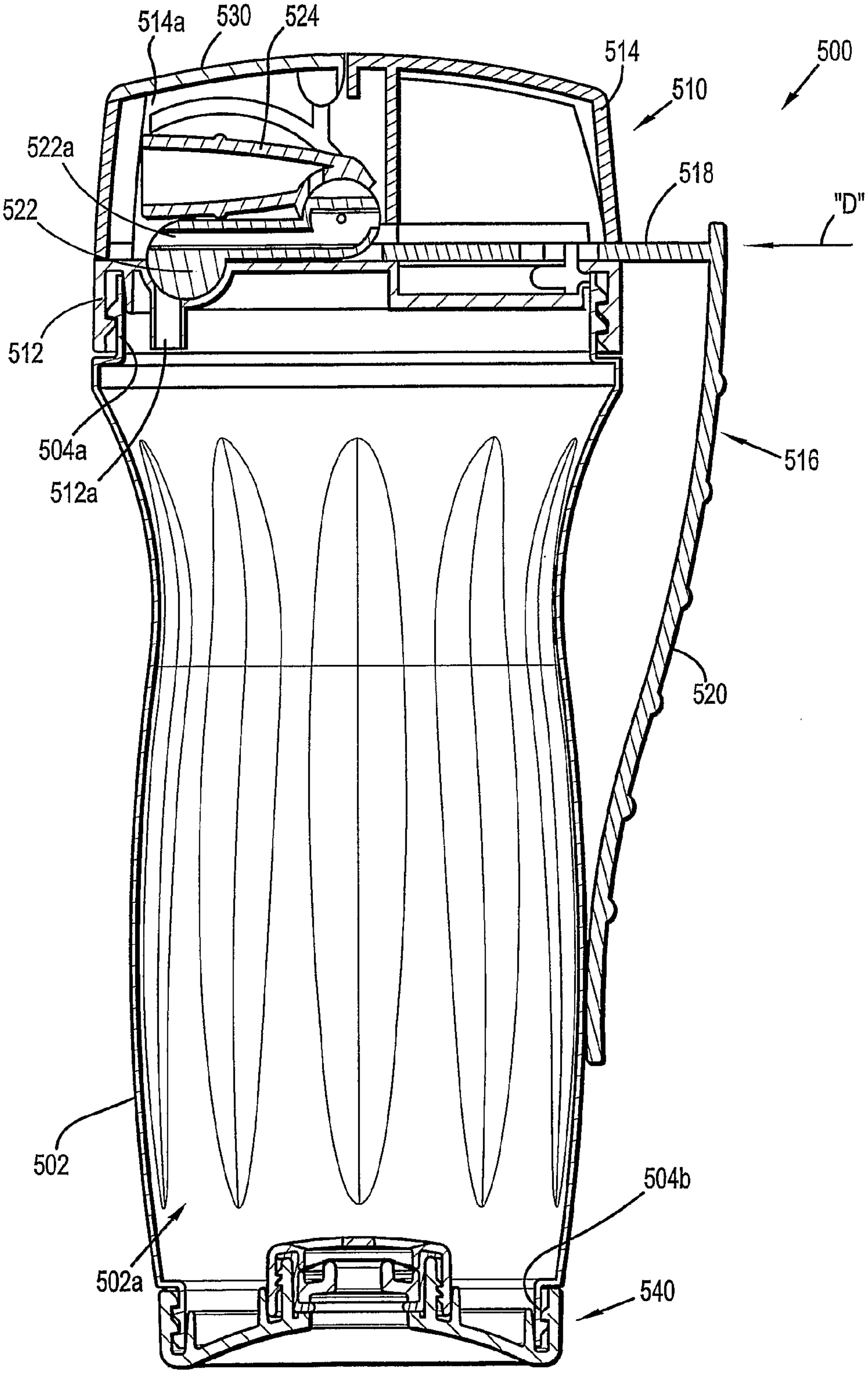
FIG. 13 is a longitudinal, cross-sectional view of the bottle assembly of FIGS. 11 and 12, as taken through 13-13 of FIG. 12.
Figure 14:
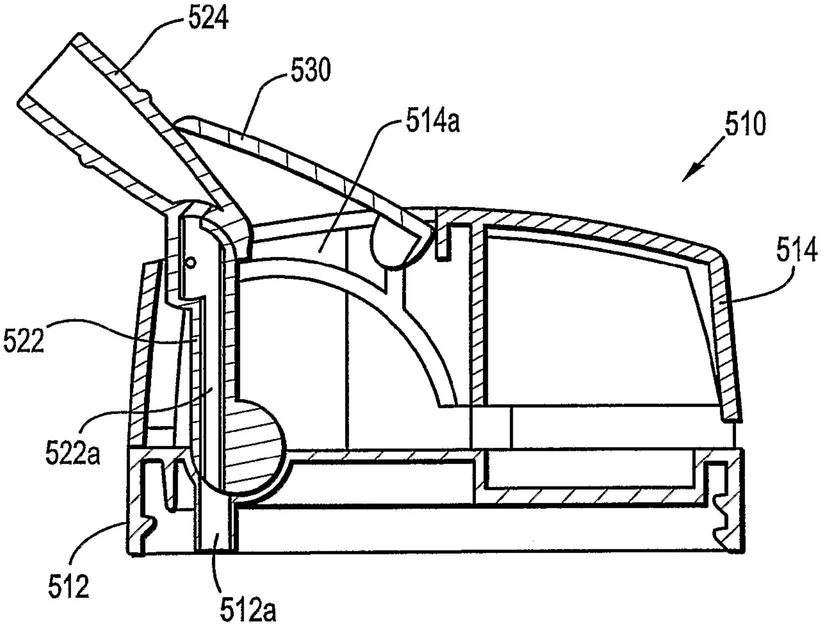
FIG. 14 is a longitudinal cross-sectional view of a cover assembly of the bottle assembly of FIGS. 11-13.
Figure 15:
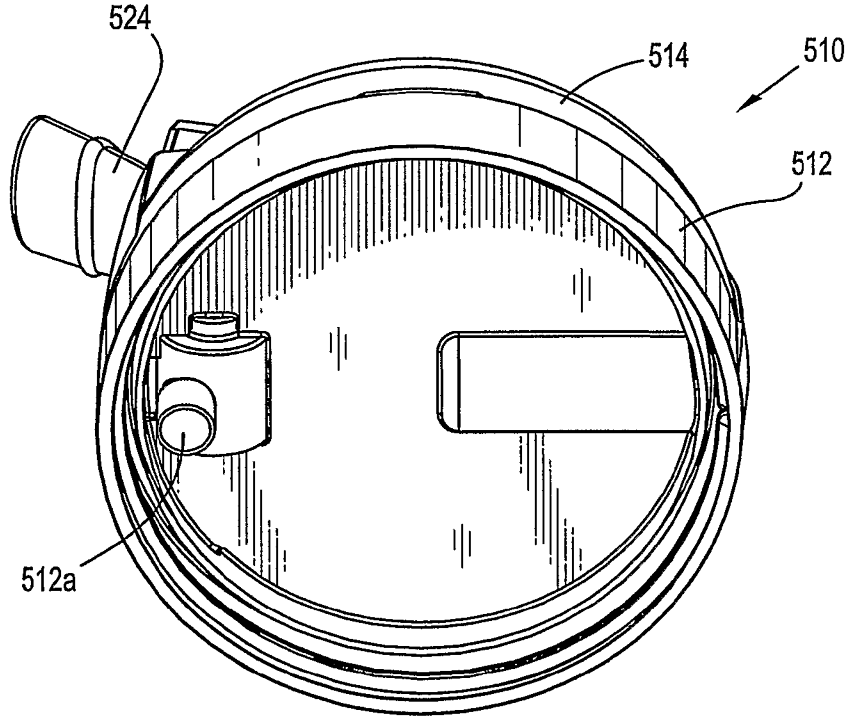
FIG. 15 is a bottom perspective view of the cover assembly of FIG. 14.
Figure 16:
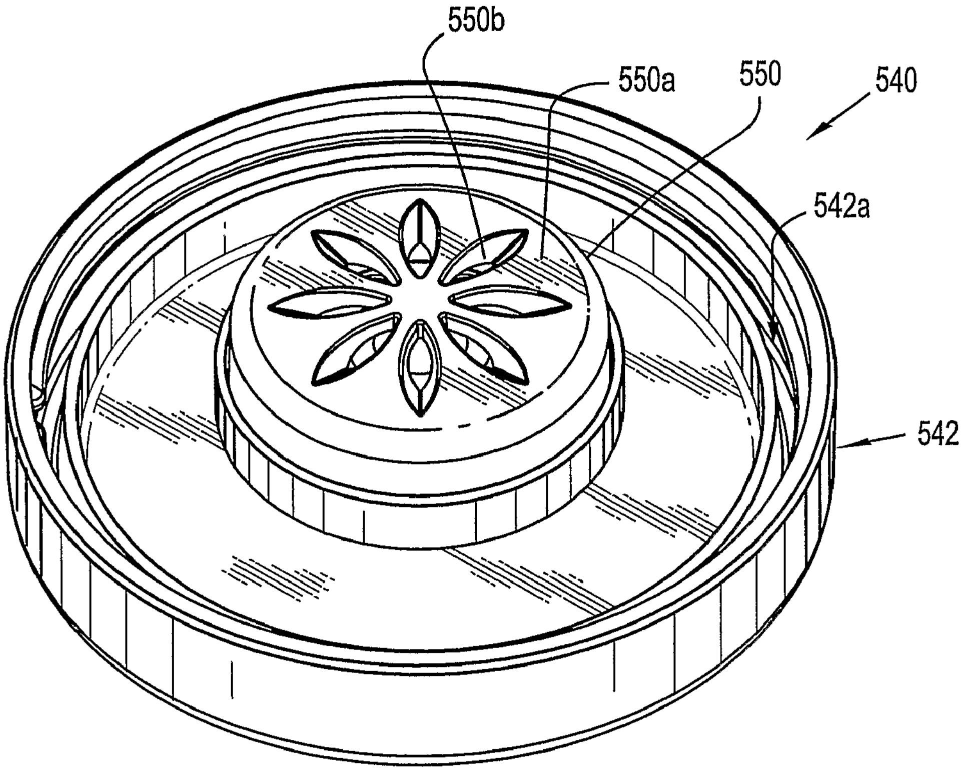
FIG. 16 is a top perspective view of a base assembly of the bottle assembly of FIGS. 11-13.
Figure 17:
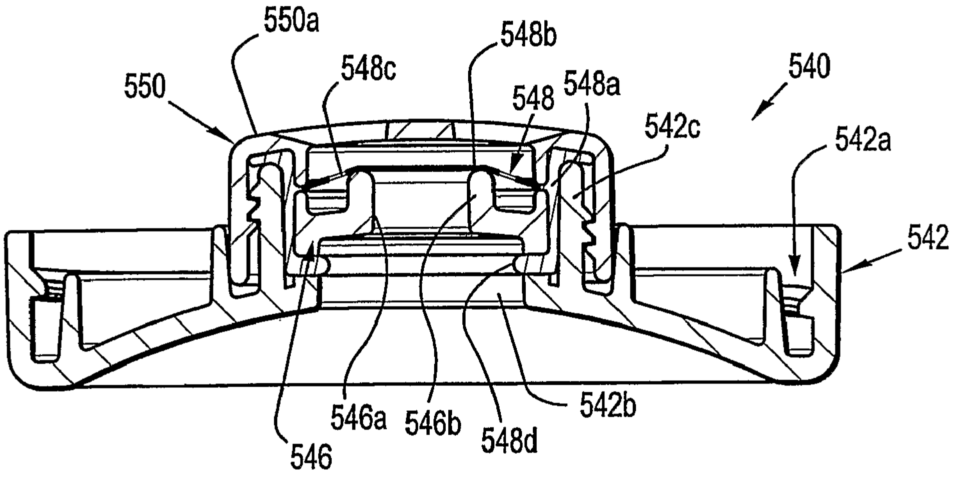
FIG. 17 is a longitudinal cross-sectional view of the base assembly of FIG. 16.

As seen in FIGS. 13, 14 and 18, cover assembly 510 includes a straw stand 522 pivotally connected to lid member 512, and a spout 524 pivotally connected to an end of straw stand 522. Straw stand 522 defines a lumen 522*a* extending therethrough. As seen in FIG. 18, straw stand 522 includes engaging members 522*b* extending therefrom for pivotal engagement with fingers 518*a* extending from slide arm 518 of trigger 516. In this manner, as trigger 516 is manipulated from the first position to the second position, straw stand 522 is moved from a first position (see FIG. 13) in which lumen 522*a* thereof is out of fluid engagement with a port 512*a* formed in lid member 512, to a second position (see FIGS. 14 and 15) in which lumen 522*a* thereof is in fluid engagement with port 512*a* of lid member 512.

Additionally, as trigger 516 is manipulated from the first position to the second position, lumen 522*a* of straw stand 522 is moved from a first position (see FIG. 13) in which lumen 522*a* thereof is out of fluid engagement with a lumen 524*a* of spout 524, to a second position (see FIG. 14) in which lumen 522*a* thereof is in fluid engagement with lumen 524*a* of spout 524. In this manner, when in the second position, fluid may be dispensed from cavity 502*a* of body portion, out of spout 524 through straw stand 522.

As seen in FIG. 18, a link 528 may be provided to help maintain straw stand 522 operatively connected to spout 524. A spout lid 530 may be pivotally connected to spout cover 514 and may be configured and dimensioned to close opening 514*a* of spout cover 514 when trigger 516 is in the first or closed position. An umbrella valve 532 may be operatively supported on lid member 512 for providing venting to cavity 502*a* of body portion 502 during charging and/or recharging of the same.

Bottle assembly 500 includes a base assembly 540 selectively connectable with a bottom rim 504*b* of body portion 504. As seen in FIGS. 13 and 16-18, base assembly 540 includes a bottom cover 542 defining an annular channel 542*a* configured and adapted to removably snap-fit engage bottom rim 504*b* in a fluid tight manner. Bottom cover 542 defines a central opening 542*b* formed therein.

Base assembly 540 further includes a one-way valve assembly 544 operatively connected to bottom cover 542 and disposed over central opening 542*b*. As will be described in greater detail below, one-way valve assembly 544 enables passage of fluid into cavity 502*a* of body portion 502 and not out of cavity 502*a* of body portion 502. In particular, one-way valve assembly 544 includes a valve insert 546 which is disposed over central opening 542*b* of bottom cover 542 and which includes an opening 546*a* therethrough defined by an inner annular wall 546*b*. Desirably, valve insert 546 is disposed within an annular rim 542*c* extending from bottom cover 542 and surrounding central opening 542*b* thereof.

One-way valve assembly 544 further includes a valve diaphragm 548 operatively disposed over valve insert 546. Valve diaphragm 548 includes an annular wall 548*a* and a membrane 548*b* extending across annular wall 548*a*. Membrane 548*b* of valve diaphragm 548 includes at least one aperture or window 548*c* formed therein. Valve diaphragm 548 is formed from an elastomeric material. Accordingly, when valve diaphragm 548 is properly secured in position, membrane 548*b* extends across an inner annular wall 546*b* of valve insert 546. Desirably, each aperture 548*c* of membrane 548*b* is disposed radially outward of annular wall 546*b* of valve insert 546. When membrane 548*b* is in contact with annular wall 546*b* of valve insert 546, a fluid tight seal is created therebetween. In order to break the fluid tight seal, membrane 548*b* must be separated from annular wall 546*b* of valve insert 546.

One-way valve assembly 544 further includes a valve cap 550 configured and adapted to selectively engage annular rim 542*c* of bottom cover 542. Valve cap 550 includes a top wall 550*a* defining at least one aperture or window 550*b* therein. Valve cap 550 is configured and dimensioned such that top wall 550*a* thereof is spaced a distance from annular wall 546*b* of valve insert 546.

In use, when a filling nipple configured to deliver fluid is introduced into central opening 542*b* of bottom cover 542 and through opening 546*a* of valve insert 546, a fluid tight seal is formed around an outer surface of the nipple by a seal 548*d*. Seal 548*d* is desirably an integral extension of annular wall 548*a* of valve diaphragm 548. A pressure of the fluid "F" to be delivered to cavity 502*a* of body portion, which is greater than a predetermined pressure (e.g. greater than about 10 psi or 68.95 pascal), causes membrane 548*b* to separate from annular wall 546*b* of valve insert 546 and permits fluid to flow between membrane 548*b* and annular wall 546*b*, through apertures 548*c*, and out through apertures 550*b* of valve cap 550 into cavity 502*a* of body portion 502. Once the pressure of the fluid is reduced below a predetermined level, membrane 548*b* re-engages or returns into contact with annular wall 546*b* of valve insert 546 to once again create the fluid tight seal therebetween and prevent leakage of fluid from cavity 502*a* of body portion 502 back through one-way valve assembly 540.

Alternatively, it is envisioned that a tip of the filling nipple may press into membrane 548*b* which in turn causes membrane 548*b* to separate from annular wall 546*b* of valve insert 546.

Turning now to FIGS. 19-22, a charging valve assembly, for use with and for filling or re-filling bottle assembly 500, is generally shown as 600. Charging valve assembly 600 includes a bung or fitting 602 including a stem 602*a* for connection to a fluid supply line and defining a fluid passage 602*b* therethrough.

Charging valve assembly 600 further includes a dispenser manifold 604 including a base wall 606 defining a central opening 606*a* and an annular rim 606*b* extending from a bottom of base wall 606 and around central opening 606*a*. Annular rim 606*b* is configured and dimensioned to fluidly connect with fitting 602 and to establish fluid communication between fluid passage 602*b* of fitting 602 and central opening 606*a* of dispenser manifold 604. Dispenser manifold 604 includes an annular outer wall 608 extending upwardly from base wall 606 and thus defines a recess 608*a* therein. Dispenser manifold 604 further includes a nipple 610 extending upwardly from base wall 606 and in fluid communication with central opening 606*a* of base wall 606. Nipple 610 defines a fluid passage or lumen 610*a* extending therethrough and an aperture 610*b* formed in an upper surface thereof.

Charging valve assembly 600 further includes a plunger 612 slidably supported within lumen 610*a* of nipple 610, central opening 606*a* of dispenser manifold 604, and fluid passage 602*b* of fitting 602. Plunger 612 includes at least one arm 612*a* extending radially outwardly from nipple 610 and into recess 608*a* of dispenser manifold 604. Plunger 612 further includes a plug 612*b* configured and dimensioned to mate with and/or selectively occlude opening 610*b* of nipple 610. Plunger 612 defines a lumen or passage 614 therethrough and terminating in an upper annular passage 614*a*. Annular passage 614*a* is disposed radially outward of plug 612*b*.

Desirably, a plurality of seals or O-rings is disposed about plunger 612. In particular, a first seal 616*a* is disposed about plug 612*b* to create a fluid tight seal between opening 610*a* in nipple 610 and plug 612*b* of plunger 612, a second seal 616*b* is disposed about plunger 612, above arms 612*a*, to create a fluid tight seal between an outer surface of plunger 612 and an inner surface of nipple 610 within lumen 610*a*, and a third seal 616*c* is disposed about plunger 612, below arms 612*a*, to create a fluid tight seal between an outer surface of plunger 612 and in inner surface of fitting 602 within lumen 602*b*.

A spring member 618 may be provided to bias plunger 612 to an occluded position against nipple 610. In particular, when in the occluded position, plug 612*b* of plunger 612 occludes opening 610*b* of nipple 610. In order to open opening 610*b* of nipple 610 arms 612*a* of plunger 612 are depressed in the direction of arrow "E", biasing spring member 618 and separating plug 612*b* from opening 610*b*, thus allowing fluid to flow through lumen 602*b* of fitting 602, through lumen 614 of plunger 612 and out through opening 610*a* of nipple 610.

Charging valve assembly 600 includes a plunger cap 620 configured and dimensioned for receipt in recess 608*a* of dispenser manifold 604 and for engagement with arms 612*a* of plunger 612. Plunger cap 620 includes a central opening 620*a* configured and dimensioned to receive nipple 610 therein. Plunger cap 620 may include a spring member 622 for spring biasing to a raised condition.

Charging valve assembly 600 includes a nut 624 and a washer 626 for securing dispenser manifold 604, from beneath, to a surface (e.g., a counter or the like), in a fluid tight arrangement. A gasket 628 may be provided for placement between bottom wall 606 of dispenser manifold 604 and an upper surface of the counter.

Desirably, charging valve assembly 600 has a low profile.

Figure 22:
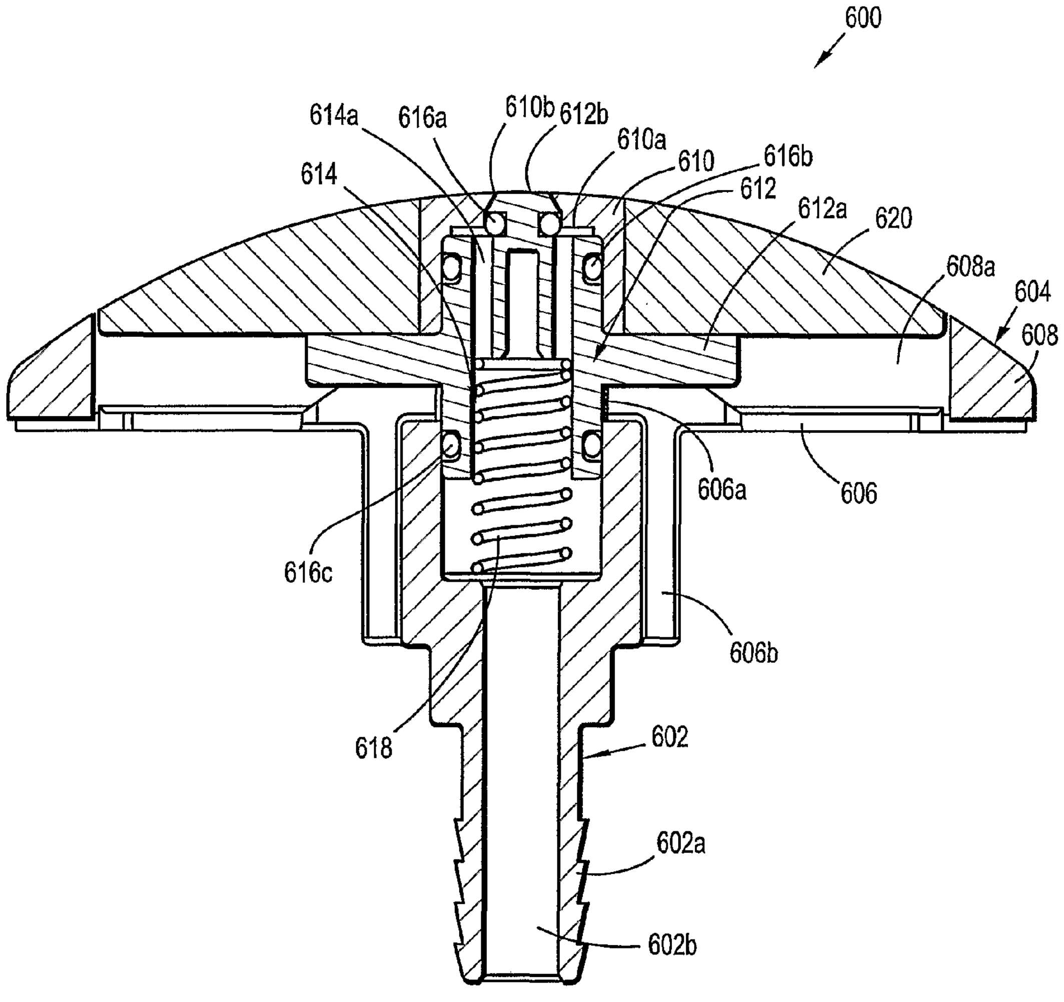
FIG. 22 is longitudinal cross-sectional view of the charging valve assembly of FIG. 20, shown in a closed condition.
Figure 22A:
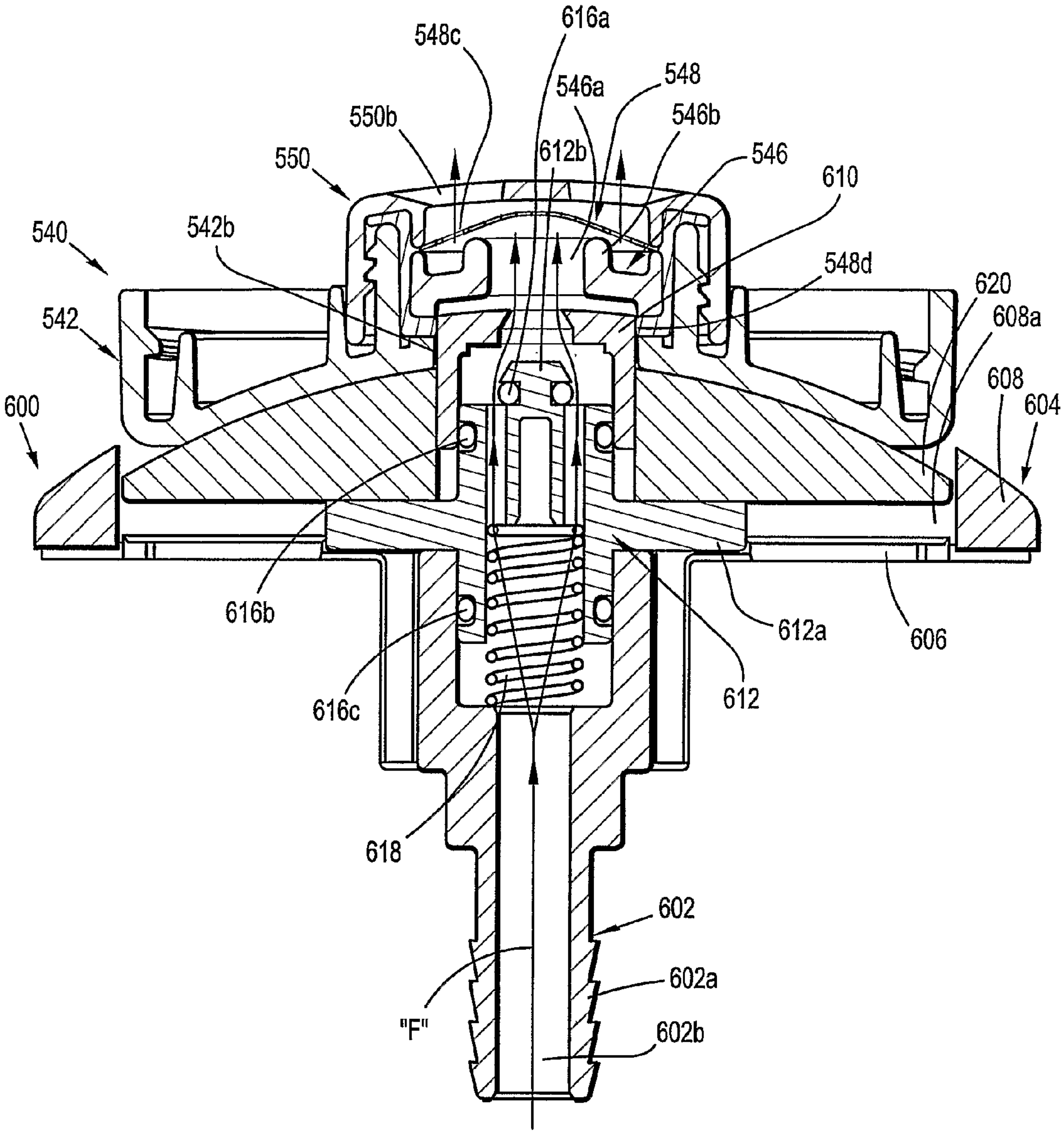
FIG. 22A is a longitudinal cross-sectional view illustrating the fluid engagement of the base assembly of FIGS. 16 and 17 with the charging valve assembly of FIGS. 19-22.
Figure 23:
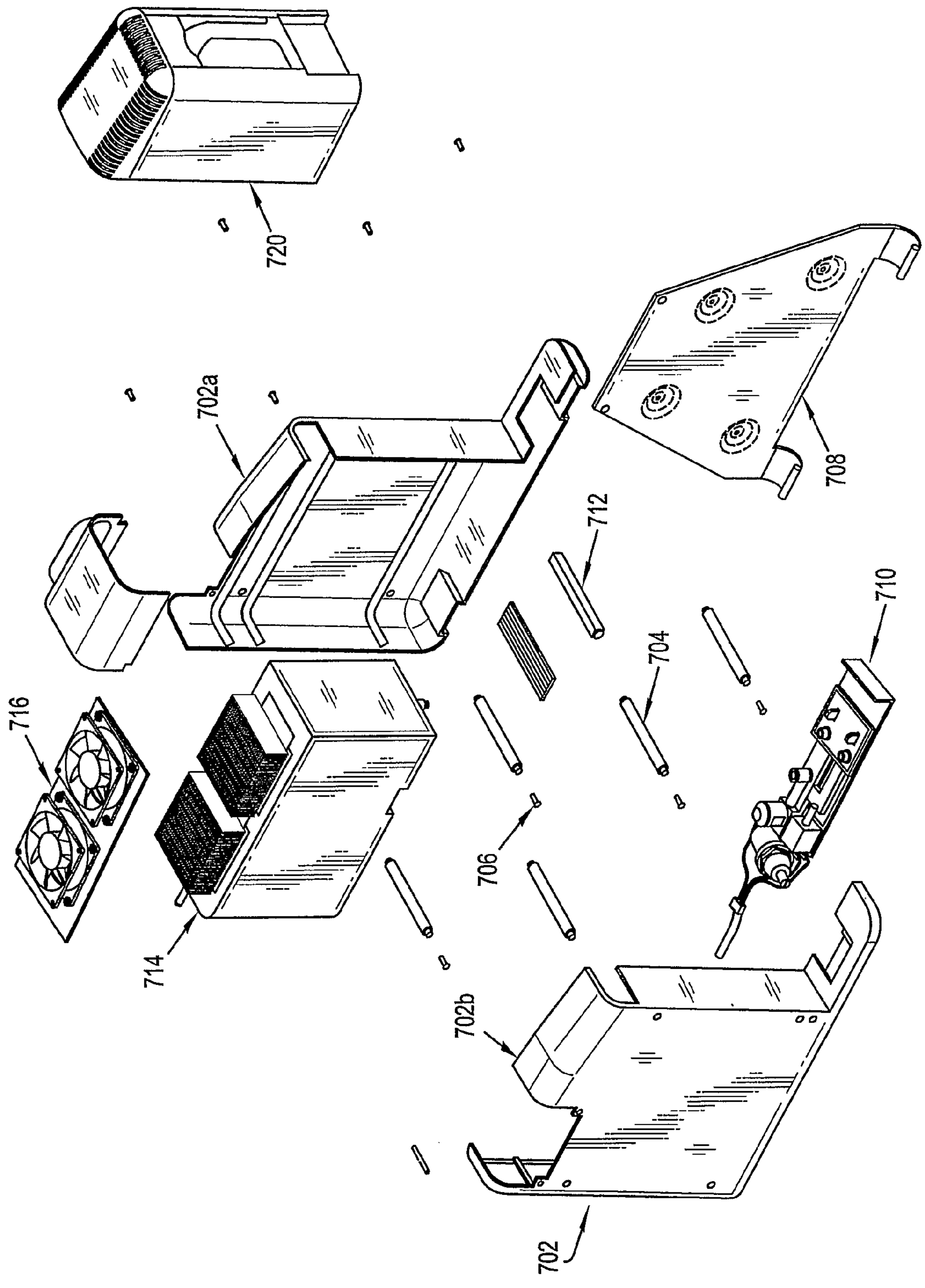
FIG. 23 is a perspective view, with parts separated, of a supply assembly according to an embodiment of the present disclosure.

As seen in FIG. 22A, use of charging valve assembly 600 with bottle assembly 500, entails placement of base assembly 540 of bottle assembly 500 onto charging valve assembly 600 such that central opening 542*b* of base assembly 540 is aligned with nipple 610 of charging valve assembly 600. Bottle assembly 500 is then pressed down onto charging valve assembly 600 such that bottle assembly 500 presses down on plunger cap 620, which in turn presses down on plunger 612, while concomitantly therewith, nipple 610 enters central opening 542*b* of bottom cover 542 and plug 612*b* of plunger 612 is spaced from opening 610*b* of nipple 610. With bottle assembly 500 so positioned on charging valve assembly 600 a fluid tight seal is created between seal 548*d* and an outer surface of nipple 610. As mentioned above, the force of the fluid "F" being delivered by charging valve 600 results in membrane 548*b* separating from annular wall 546*b* of valve insert 546. As so positioned, a fluid flow channel for fluid "F" is created through fitting 602, through plunger 612, through nipple 610, through one-way valve assembly 540 (i.e., through valve insert 546, through apertures 548*c* of membrane 548*b* and through apertures 550*b* of valve cap 550) of bottle assembly 500.

Desirably, the fluid is under pressure so as to force the fluid into cavity 502*a* of body portion 502. Once the desired amount of fluid is introduced into cavity 502*a* of bottle 500 or cavity 502*a* of bottle 500 is filled, bottle assembly 500 is lifted off of charging valve assembly 600. Accordingly, plug 612*b* is re-inserted into opening 610*b* of nipple 610 and the flow of fluid "F" is cut-off thereby allowing for membrane 548*b* to return into contact with annular wall 546*b* of valve insert 546 and prevent the escape of leakage of fluid "F" from within cavity 502*a* of bottle 500. The process may be repeated as many times as necessary to charge and re-charge bottle assemblies 500.

In order to fill other vessels other than bottle assemblies 500, charging valve assembly 600 may include a faucet tube 630 removably connectable to dispenser manifold 604 and nipple 610. Faucet tube 630 may be connected to dispenser manifold 604 through a faucet tube base 632, a duckbill valve 634, and a series of O-rings 636. A faucet bumper 638 may be provided for the tip of faucet tube 630.

It is envisioned and within the present disclosure that any vessel for containing fluid may be adapted for bottom filling (e.g., include a one-way valve assembly operatively provided in a bottom surface thereof). For example, it is envisioned that bottles, faucet taps, juggs, mugs, cups, thermoses, vases, tubs, bowls, pots, planters, and the like may be provided with a one-way valve assembly for filling from the bottoms thereof.

Turning now to FIGS. 23-29, a supply assembly for providing fluid and the like to charging valve assembly 600 is shown generally as 700. Supply assembly 700 includes a housing 702 having a first and second half-portion 702*a*, 702*b*, respectively. A series of spreaders 704 and screws 706 are used to secure the housing half-portions 702*a*, 702*b* to one another. A mounting bracket 708 may be provided for supporting housing 702 and anchoring housing 702 to a wall or the like.

Supply assembly 700 includes a hydraulic assembly 710 supported within housing 702 for pressurizing the fluid to be delivered to charging valve assembly 600. An LED display 712 may be provided which is supported in housing 702 and which provided individuals with information regarding the status of supply assembly 700, such as, for example, status of filters, fluid temperature, etc.

Supply assembly 700 includes a tank assembly 714 supported in housing 702 which stores and or retains a quantity of pre-conditioned fluid. In other words, tank assembly 714 contains fluid which has already been cooled and filtered and which is ready for dispensing. Tank assembly 714 is fluidly connectably with hydraulic assembly 710. A fan plate assembly 716 may be provided and may be in operative engagement with tank assembly 714 in order to help maintain the fluid contained within tank assembly 714, cool.

Supply assembly 700 may include a removable filter assembly 720 which is configured and dimensioned for operative connection with housing 702 and for fluid engagement with hydraulic assembly 710.

Figure 24:
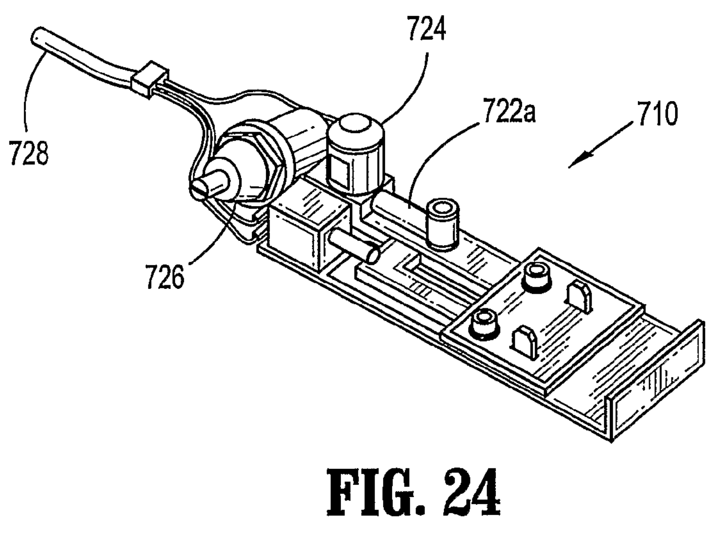
FIG. 24 is an enlarged perspective view of a hydraulics assembly of the supply assembly of FIG. 23.
Figure 25:
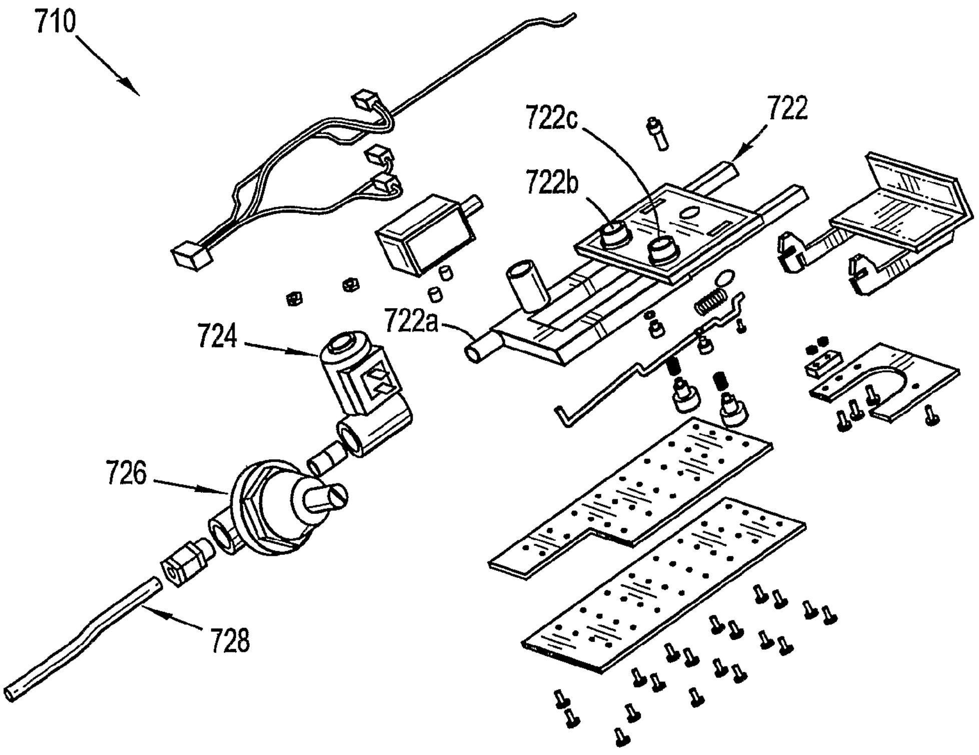
FIG. 25 is a perspective view, with parts separated, of the hydraulics assembly of FIG. 24.

As seen in FIGS. 24 and 25, hydraulic assembly 710 includes, inter alia, a support body 722, a solenoid shut-off 724 operatively connectable with a fitting 722*a* of support body 722. A pressure regulator 726 is connected to solenoid shut-off 724 and a supply line 728 is connected to pressure regulator 726. Support body 722 includes additional fittings 722*b*, 722*c* for supplying fluid to filter assembly 720 and for returning fluid from filter assembly 720. Supply assembly 700 may include a solenoid filter 730 in fluid engagement with solenoid shut-off 724.

Figure 26:
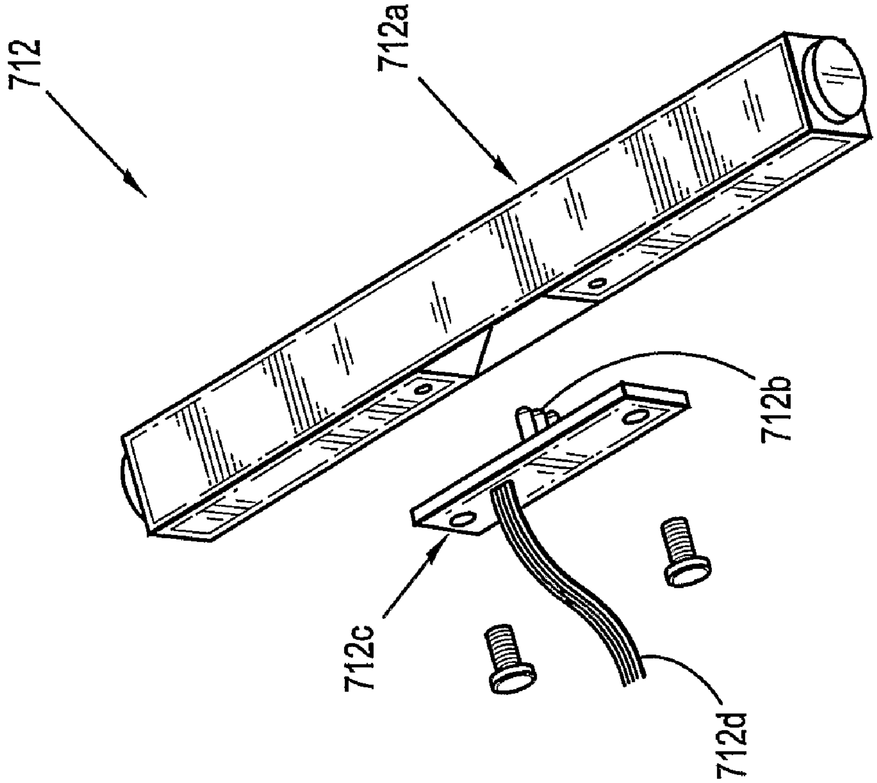
FIG. 26 is a perspective view, with parts separated, of an LED assembly of the supply assembly of FIG. 23.

As seen in FIG. 26, LED display 712 includes a lite pipe 712*a*, and a plurality of LEDS 712*b* operatively associated with lite pipe 712*a* and supported on a printed circuit board (PCB) 712*c*. A cable ribbon 712*d* connects PCB 712*b* to a controller or the like (not shown). PCB 712*b* monitors and keeps track of the number of uses of supply assembly 700 and/or the life of filter assembly 720, and then transmits that information to LED display 712 in order to indicate to the user when a change of the filters of filter assembly 720 may be warranted.

Figure 27:
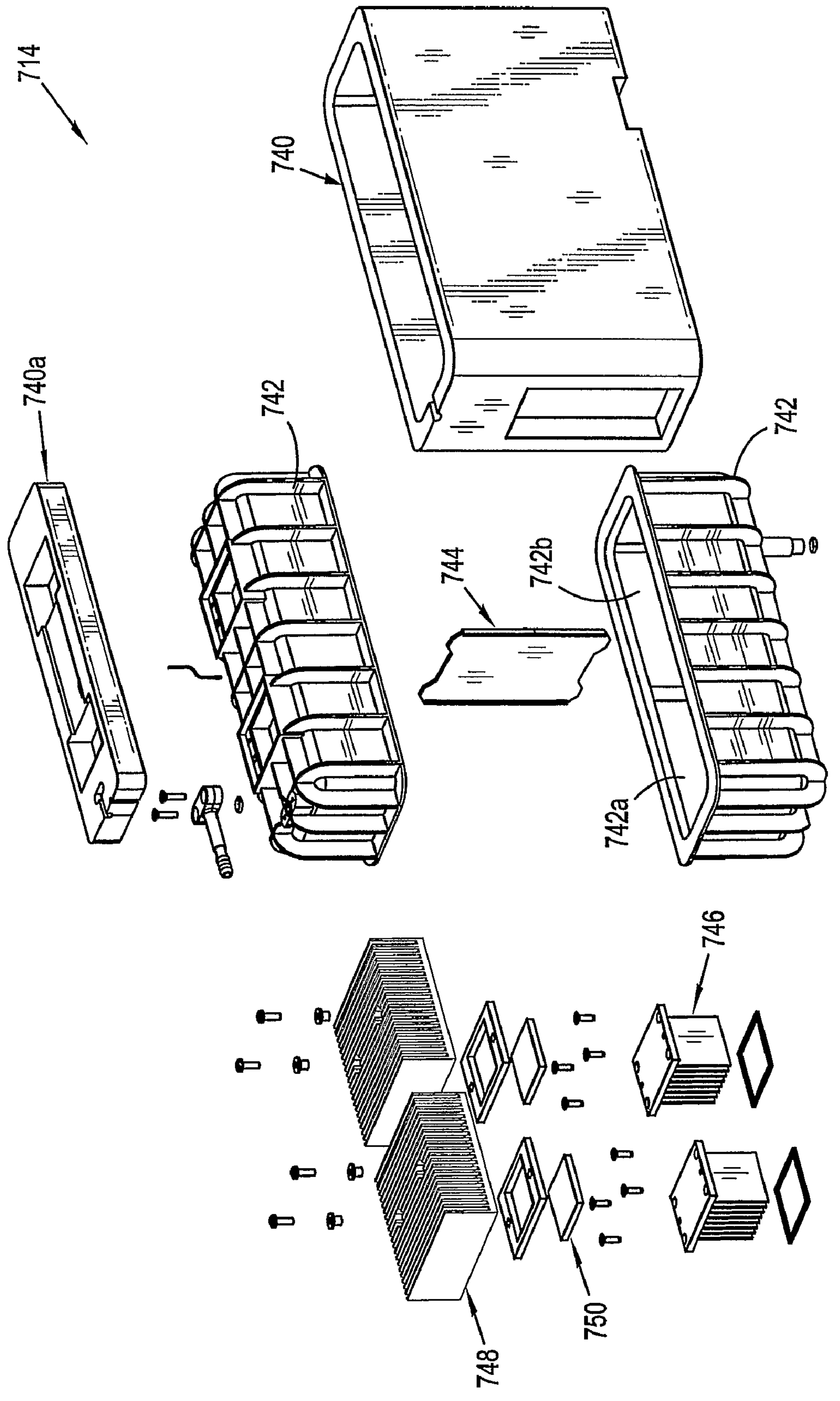
FIG. 27 is a perspective view, with parts separated of a tank assembly of the supply assembly of FIG. 23.
Figure 28:
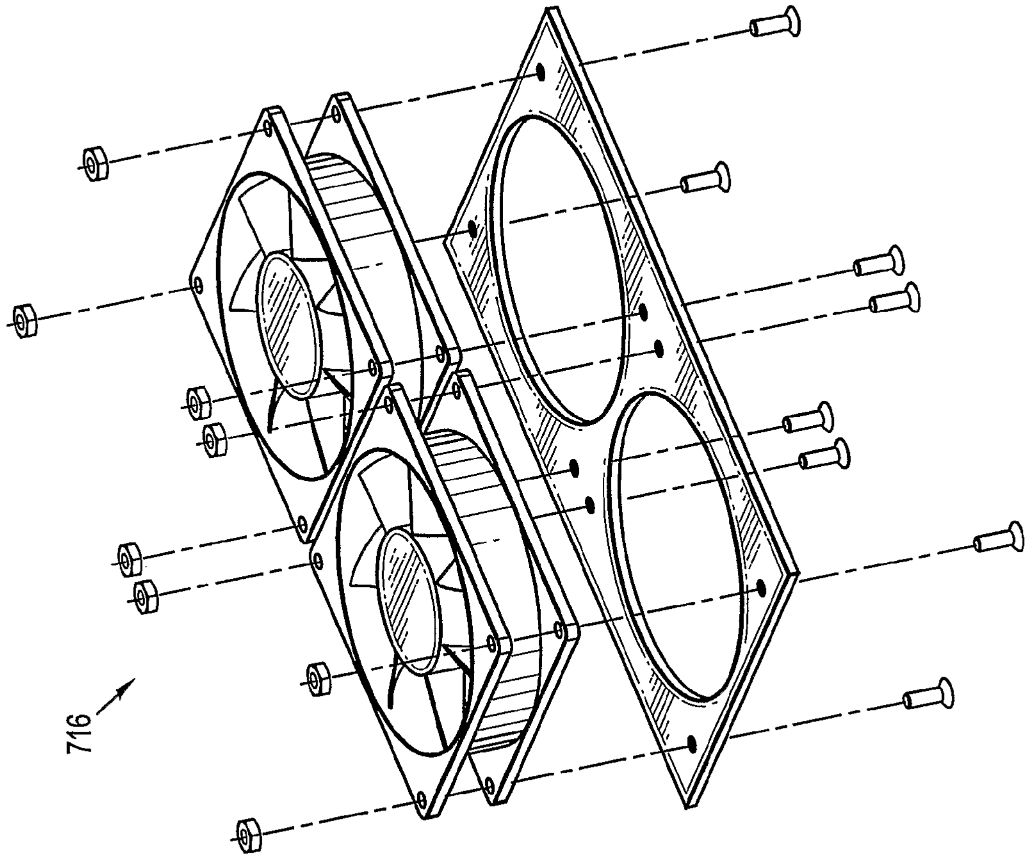
FIG. 28 is a perspective view, with parts separated, of a fan plate assembly of the supply assembly of FIG. 23.

As seen in FIG. 27, tank assembly 714 includes an insulated housing 740 including an insulated top 740*a*. Tank assembly 714 includes a reservoir 742 defining a volume for retaining fluid therein. Reservoir 742 is divided into a first chamber 742*a* and a second chamber 742*b* by a screen or filter 744. First heat sinks 746 may be provided which extending in to chambers 742*a*, 742*b* of reservoir 742 and help to cool fluid contained therein. Second heat sinks 748, operatively connected to first heat sinks 746 through peltiers 750, are provided to dissipate the heat with the air. As seen in FIG. 28, a fan plate assembly 716 may be provided which is in operative engagement with second heat sinks 748 for enhancing the cooling thereof.

In use, hydraulic assembly 710 forces fluid through reservoir 742 for cooling and initial filtering.

Figure 29:
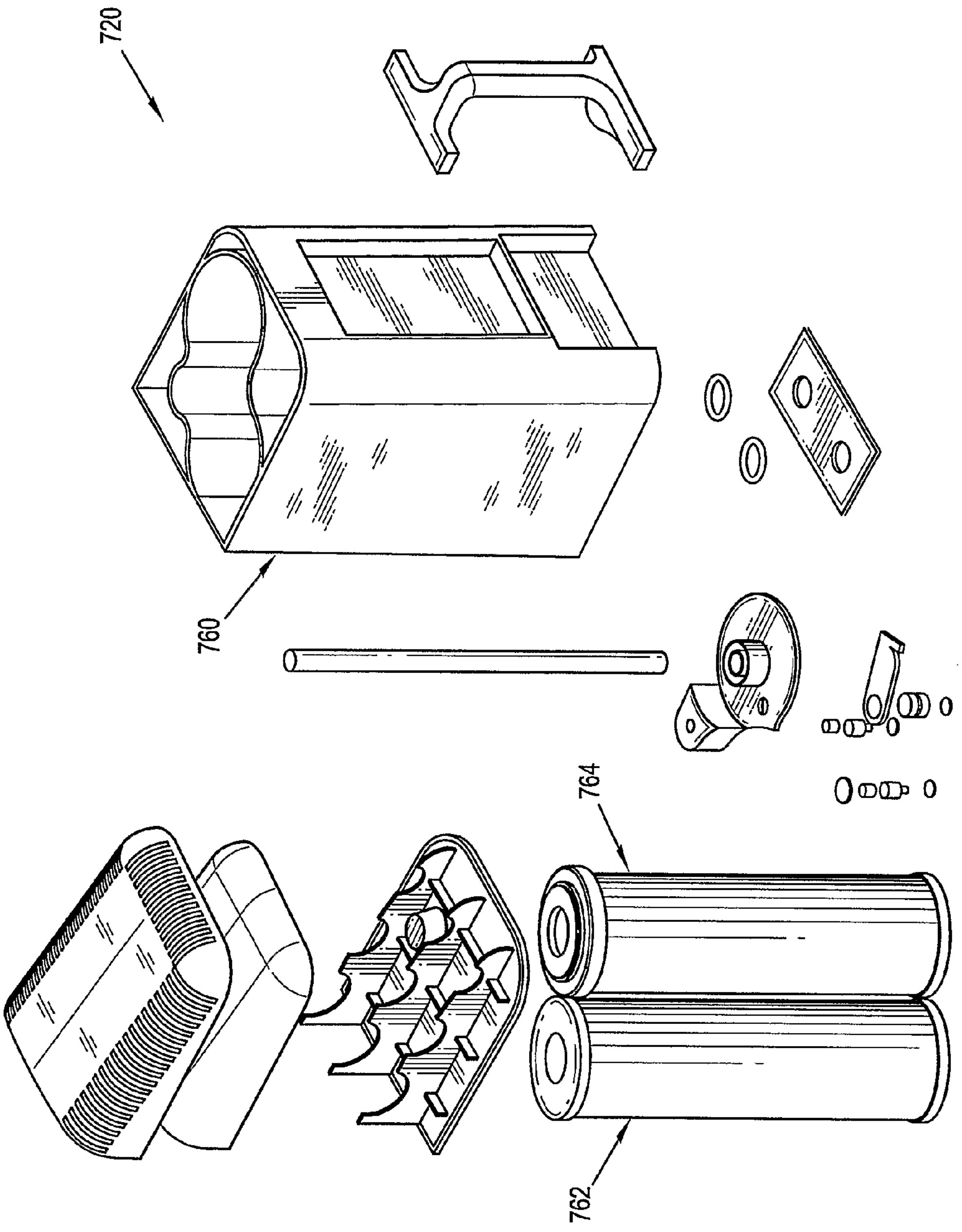
FIG. 29 is a perspective view, with parts separated, of a filter assembly for use with the supply assembly of FIG. 23.

As seen in FIG. 29, filter assembly 720 includes a housing 760 configured and adapted to removably retain a sediment filter 762 and a carbon-block filter 764 therein. In use, fluid is pumped from hydraulic assembly 710 through reservoir 742 and through filter assembly 720, in any order desired, prior to transmission to charging valve assembly 600.

It is envisioned that supply assembly 700 may be provided with an automatic filter replacement mechanism or the like. In use, when it is time to replace either of sediment filter 762, carbon-block filter 764 or any other filter, an indicator signal alerts the user that such a change is necessary. The user then presses a first button or switch (e.g., a change filter button/switch) which automatically activates/manipulates the water supply valve to turn off the water supply, and which automatically activates/manipulates a release mechanism which automatically disconnects the filter from the water supply or the like (i.e., rotates the filter to unlock the filter). The user then exchanges the used filter with a new filter. Once the new filter is in position, the user presses a second button/switch which automatically activates/manipulates the release mechanism to thereby lock the new filter into fluid communication with the water supply, to open the water supply valve, and to reset the counter.

Figure 30:
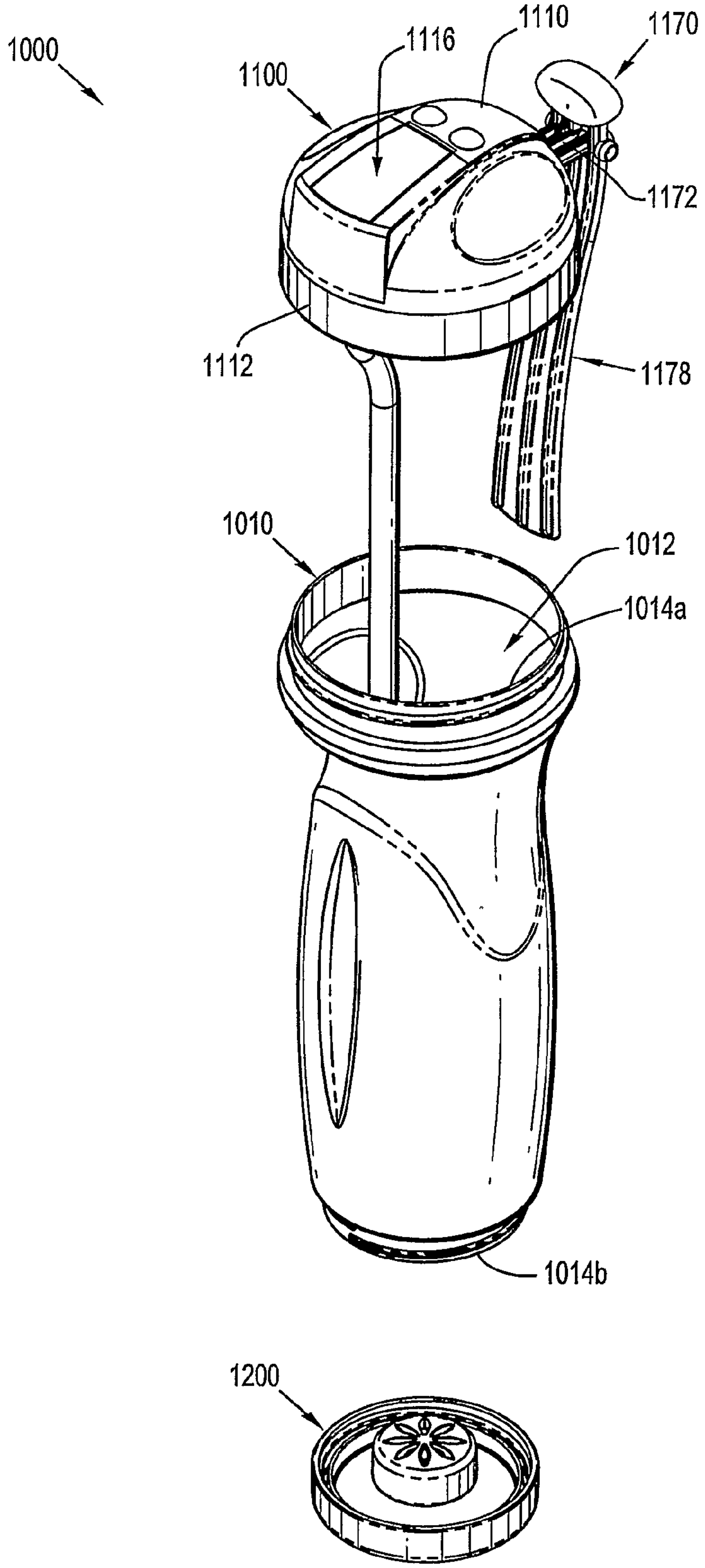
FIG. 30 is a perspective view, with parts separated, of a bottle assembly in accordance with another embodiment of the present disclosure.

Turning now to FIGS. 30-49, a bottle assembly according to another embodiment of the present disclosure is generally designated as 1000. As seen in FIG. 30, bottle assembly 1000 includes a body portion 1010, a top lid assembly 1100 configured and adapted for selective connection to an upper rim or edge of body portion 1010; and a bottom lid assembly 1200 configured and adapted for selective connection to a lower rim or edge of body portion 1010.

As seen in FIG. 30, body portion 1010 defines a cavity 1012 for receiving, retaining and/or storing a fluid therein. Body portion 1010 is ergonomically formed to accommodate a hand of a user during use and manipulation of bottle assembly 1000. Body portion 1010 includes an upper rim 1014*a* configured and adapted to operatively engage top lid assembly 1100; and a bottom rim 1014*b* configured and adapted to operatively engage bottom lid assembly 1200. It is envisioned that each of upper rim 1014*a* and bottom rim 1014*b* may include a thread for engaging a complementary thread provided on or in top lid assembly 1100 and bottom lid assembly 1200, respectively. It is further envisioned that each of upper rim 1014*a* and bottom rim 1014*b* and each of top lid assembly 1100 and bottom lid assembly 1200, may include any complementary engaging structure, such as, for example, bayonet-type structure, screw threads and the like.

Figure 33:
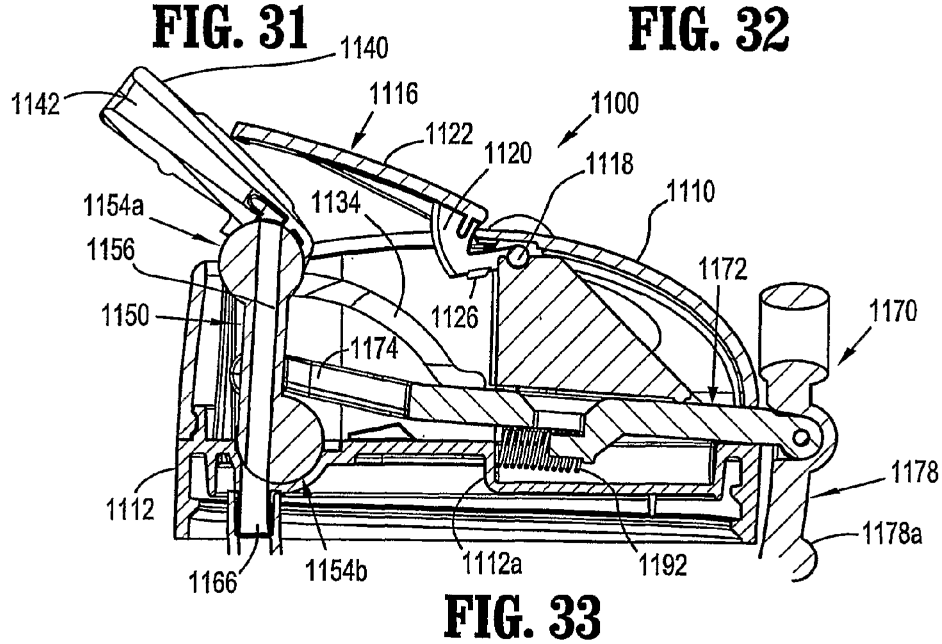
FIG. 33 is a longitudinal, cross-sectional view of the top lid assembly of FIG. 32 in an open condition.
Figure 34:
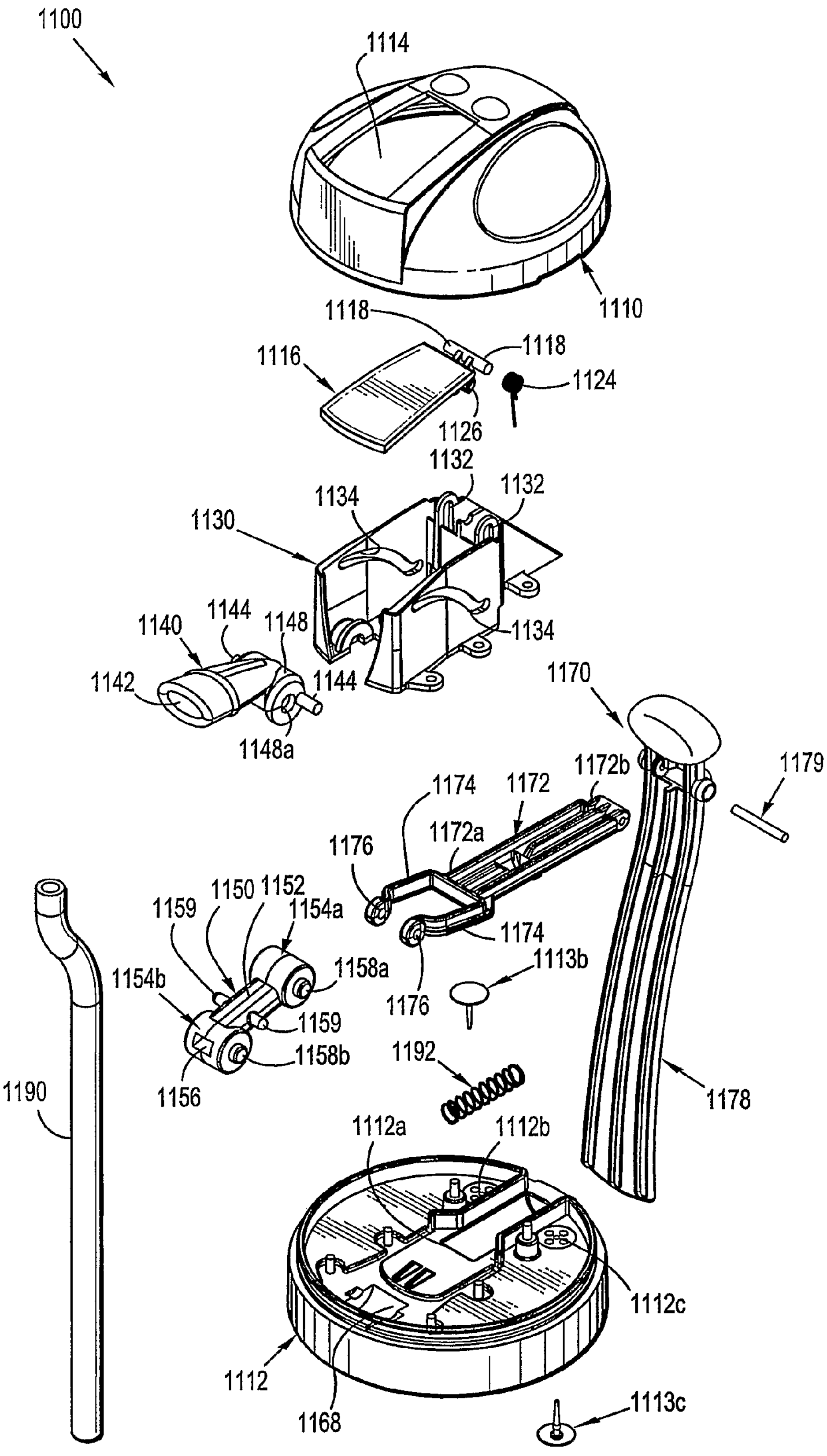
FIG. 34 is an exploded perspective view of the top lid assembly of FIGS. 32 and 33.
Figure 35:
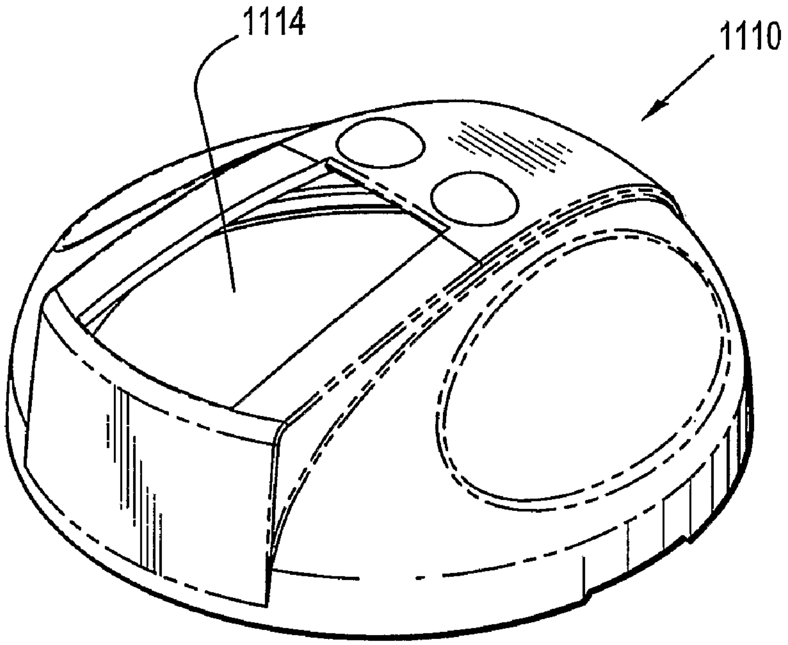
FIG. 35 is a perspective view of a spout cover of the top lid assembly of FIGS. 32-34.
Figure 36:
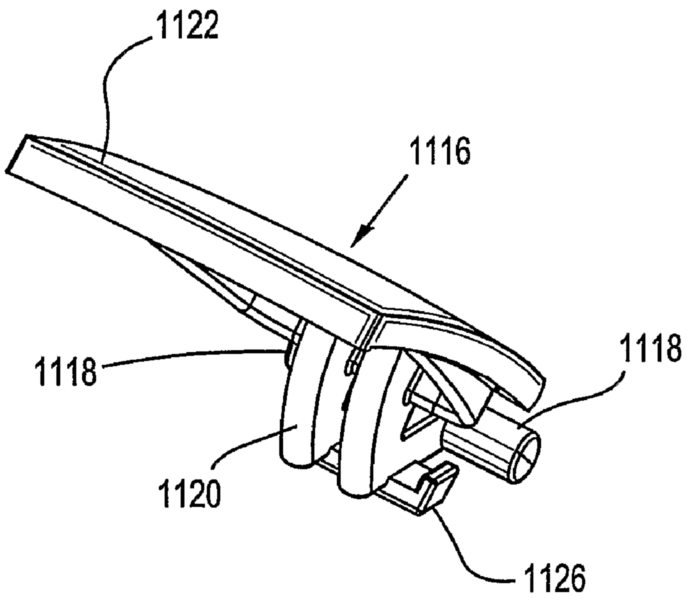
FIG. 36 is a perspective view of a spout lid of the top lid assembly of FIGS. 32-34.

With particular reference to FIGS. 30-46, a detailed description of top lid assembly 1100 will now be provided. Top lid assembly 1100 includes a spout cover 1110 supported on or snap-fit engaged to a spout bottom lid 1112, which spout bottom lid 1112 is configured and adapted to operatively engage upper rim 1014*a* of body portion 1010. As best seen in FIGS. 34 and 35, spout cover 1110 defines a window 1114 formed therein, through which a spout is selectively deployable, as will be described in greater detail below.

Figure 32:
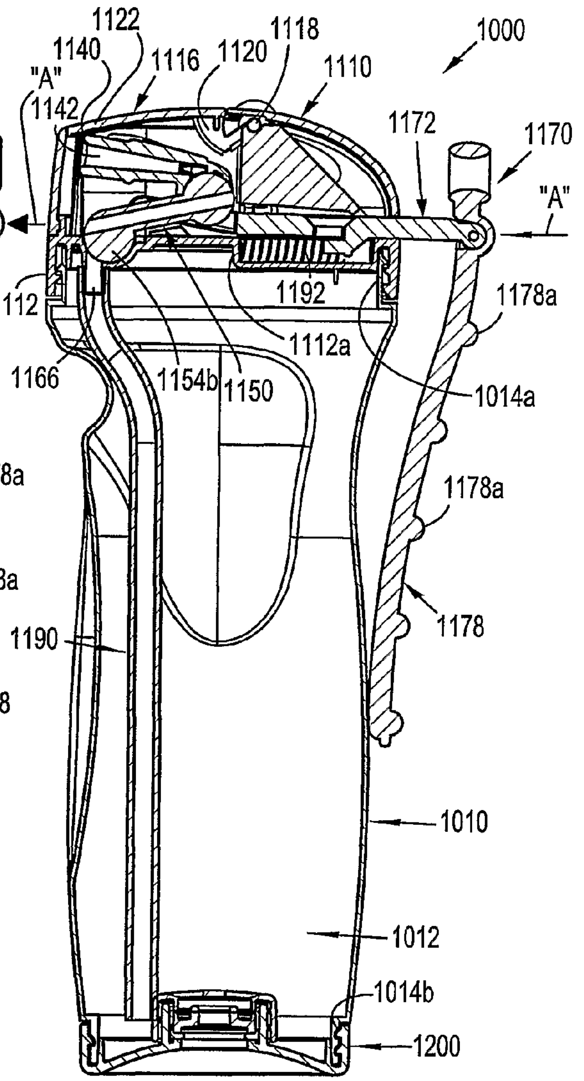
FIG. 32 is a longitudinal, cross-sectional view of the bottle assembly of FIGS. 30 and 31, illustrating the top lid assembly thereof in a closed condition.

Top lid assembly 1100 includes a spout lid 1116 operatively associated with spout cover 1110 to selectively close and open window 1114 formed therein and allow for the spout to extend or be deployed therefrom. Spout lid 1116 includes a pair of pivot bosses 1118 extending outwardly from a support arm 1120 extending from a bottom surface of flap 1122. Spout lid 1116 is pivotable from a first condition, as seen in FIG. 32, in which flap 1122 of spout lid 1116 closes window 1114 of spout cover 1110 to a second condition, as seen in FIG. 33, in which flap 1122 of spout lid 1116 opens window 1114 of spout cover 1110 to enable a spout to extend therefrom.

It is envisioned that top lid assembly 1100 may include structure or the like for maintaining spout lid 1116 in the first or closed condition or for automatically returning spout lid 1116 to the closed condition following opening thereof. For example, top lid assembly 1100 may include a biasing member 1124 for accomplishing such an automatic closing function. In particular, as seen in FIG. 34, top lid assembly 1100 may include a torsion spring 1124 which is supported on one of pivot bosses 1118 and which includes a first arm thereof for engaging a ledge 1126 provided on spout lid 1116 and a second arm thereof for engaging structure of top lid assembly 1100 other than spout lid 1116. In this manner, in operation, torsion spring 1124 will tend to maintain spout lid 1116 in the closed condition as described above.

Figure 37:
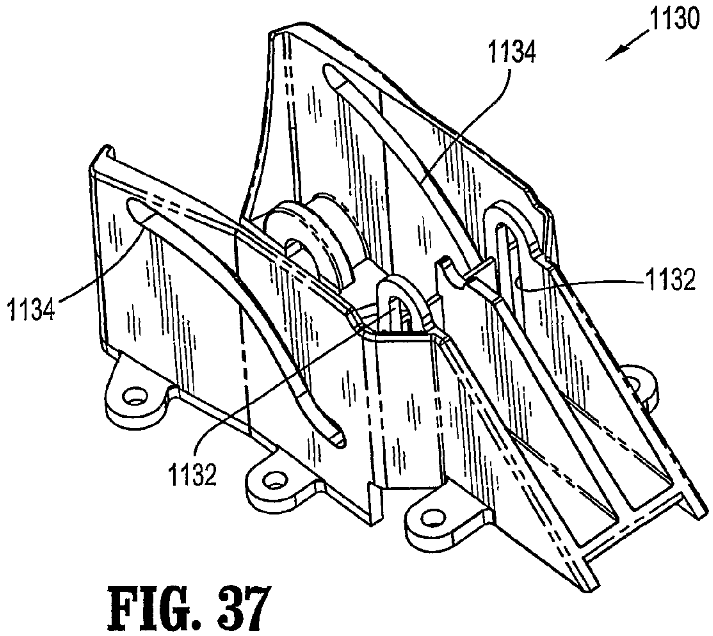
FIG. 37 is a perspective view of a cam member of the top lid assembly of FIGS. 32-34.
Figure 38:
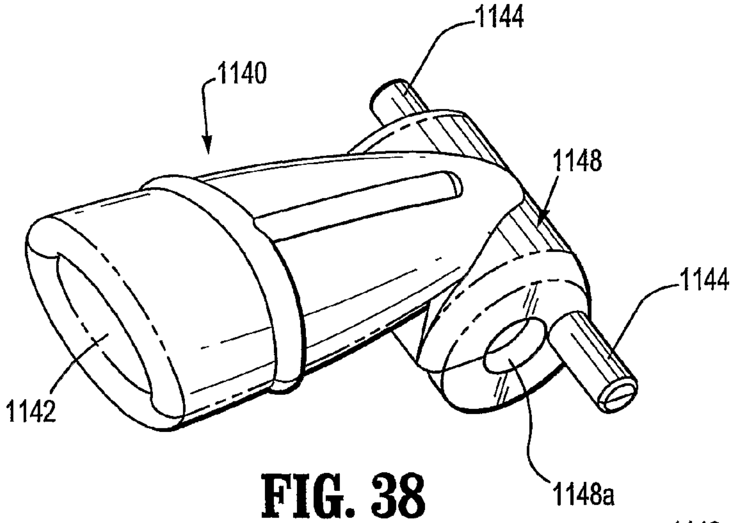
FIG. 38 is a top perspective view of a spout of the top lid assembly of FIGS. 32-34.
Figure 39:
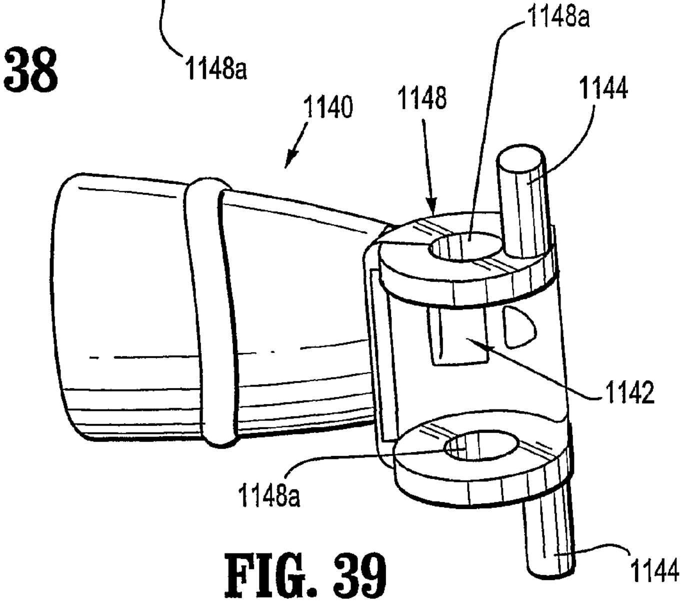
FIG. 39 is a bottom perspective view of the spout of FIG. 38.

With reference to FIGS. 32-34 and 37, top lid assembly 1100 includes a cam member 1130 operatively supported between spout cover 1110 and spout bottom lid 1112. As seen in FIGS. 34 and 37, cam member 1130 includes a pair of spaced apart, elongate, linear slots 1132 formed therein for slidably and pivotably receiving pivot bosses 1118 of spout lid 1116. Cam member 1130 further defines a pair of spaced apart cam slots 1134 formed therein for guiding and facilitating deployment and retraction of the spout out of and into spout cover 1110.

With reference to FIGS. 32-34 and 38-41, top lid assembly 1100 further includes a spout 1140 supported in cam member 1130. Spout 1140 defines a lumen 1142 extending therethrough and at least one guide pin 1144 extending outwardly therefrom. Desirably, a pair of guide pins 1144 are provided which slidably engage cam slots 1134 of cam member 1130. Spout 1140 is ergonomically shaped so as to be better received between the lips of a user. In particular, spout 1140 has a generally conical or frusto-conical outer profile which expands in a distal direction. It is further envisioned that lumen 1142 may have a generally ovular or elliptical inner profile or the like.

With continued reference to FIGS. 32-34 and 38-41, top lid assembly 1100 further includes a straw stand 1150 pivotably supported between spout bottom lid 1112 and cam member 1130. Straw stand 1150 includes a central body portion 1152, a first lobe 1154*a* integrally formed at a first end 1152*a* of central body portion 1152, a second lobe 1154*b* integrally formed at a second end 1152*b* of central body portion 1152, and a lumen 1156 extending entirely therethrough. First lobe 1154*a* of straw stand 1150 includes a pair of pivot bosses 1158*a* formed on either side thereof for engaging pivot openings 1148*a* formed in lobe 1148 of spout 1140. Second lobe 1154*b* of straw stand 1150 is slidably seating within a complementary arcuate recess 1168 formed in a top surface of spout bottom lid 1112. Second lobe 1154*b* of straw stand 1150 may include a pair of pivot bosses 1158*b* formed on either side thereof for engaging pivot points defines between cam member 1130 and spout bottom lid 1112.

With reference now to FIGS. 30-46, top lid assembly 1100 further includes a trigger assembly 1170 for actuating or moving spout 1140 between an extended condition and a retracted condition. Trigger assembly 1170 includes a spout driver 1172 slidably supported between spout cover 1110 and spout bottom lid 1112. Spout driver 1172 includes a proximal end 1172*b* extending from spout bottom lid 1112, and a distal end 1172*a* defining a pair of tines 1174 configured and adapted to engage straw stand 1150. In particular, each tine 1174 of spout driver 1172 includes a bore 1176 formed near a distal end thereof for pivotably receiving and/or engaging a pivot pin 1159 extending from central body portion 1152 of straw stand 1150.

Figure 31:
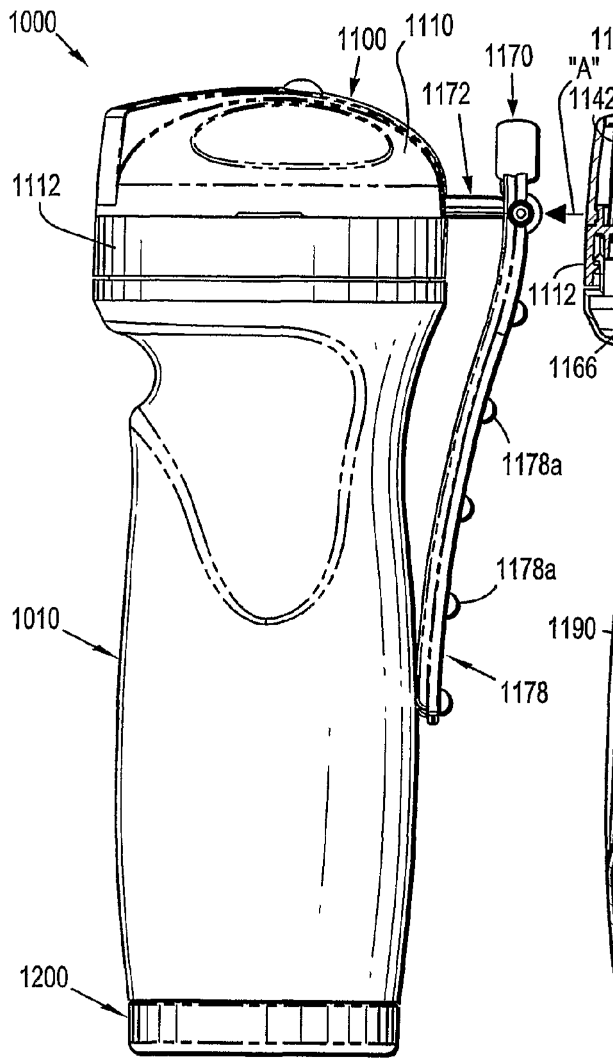
FIG. 31 is a side elevational view of the bottle assembly of FIG. 30.

In use or operation, with spout 1140 in the retracted condition and with spout cover 1110 in the closed condition, as spout driver 1172 is moved in the direction of arrow "A", as seen in FIGS. 31 and 32 (i.e., into spout cover 1110), straw stand 1150 is caused to be rotated about pivot bosses 1158*b* of second lobe 1158*b*. In so doing, guide pins 1144 of spout 1140 are caused to be slidably advanced through cam slots 1134 of cam member 1130 and spout 1140 pivots about pivot bosses 1158*a* of first lobe 1154*a* of straw stand 1150. As such, spout 1140 lifts up spout flap 1116 and extends out of spout cover 1110.

When spout 1140 is in the extended condition, as seen in FIG. 33, lumen 1142 of spout 1140 is in fluid communication with lumen 1156 of straw stand 1150 which is, in turn, in fluid communication with a port 1166 formed in recess 1168 of spout bottom lid 1112. Desirably, a straw 1190 (see FIGS. 32 and 34) is connected to port 1166 and extends down through cavity 1012 of body portion 1010. In this manner, fluid may be withdrawn from cavity 1012 of body portion 1010.

In order to retract or withdraw spout 1140 back into spout cover 1110, spout driver 1172 is moved in a direction opposite to arrow "A" thus causing straw stand to once again be rotated about pivot bosses 1158*b* of second lobe 1158*b*. In so doing, guide pins 1144 of spout 1140 are caused to be slidably retracted through cam slots 1134 of cam member 1130 and spout 1140 pivots about pivot bosses 1158*a* of first lobe 1154*a* of straw stand 1150. As such, spout 1140 pulls back, withdraws or retracts into spout cover 1110 and spout flap 1116 automatically closes, as described in detail above. With spout 1140 withdrawn into spout cover 1110, the fluid communication between lumen 1142 of spout 1140 and port 1166 of spout bottom lid 1112 is disrupted and no fluid may pass through port 1166. In fact, as seen in FIG. 32, second lobe 1154*b* of straw stand 1150 function to occlude port 1166 when spout 1140 is in the withdrawn or retracted condition.

With spout 1140 in the retracted condition, spout 1140 is protected from exposure to the elements and/or from exposure to the outside environment. In this manner, contamination of spout 1140 is reduced and/or eliminated.

It is contemplated that the retraction or withdrawal of spout 1140 back into spout cover 1110 may be accomplished automatically upon the release of spout driver 1172. For example, a biasing member 1192 (e.g., a compression spring) may be disposed between spout driver 1172 and a surface or shoulder 1112*a* of bottom spout lid 1112 or any other element of top lid assembly 1100.

As seen in FIGS. 30-34, proximal end 1172*b* of spout driver 1172 operatively supports a spout trigger 1178 via a pin 1179 or the like. As seen in FIGS. 31-33 and 44, spout trigger 1178 may include a plurality of spaced apart nubs 1178*a* formed along a length thereof which define spaces therebetween for receiving the fingers of a user.

In use, deployment and retraction of spout 1140 out of and/or into spout cover 1110 is accomplished by single handed operation. In other words, the deployment of spout 1140 from spout cover 1110 is accomplished by squeezing spout trigger 1178 with a single hand, i.e., moving spout trigger 1178 toward body portion 1010.

Figure 42:
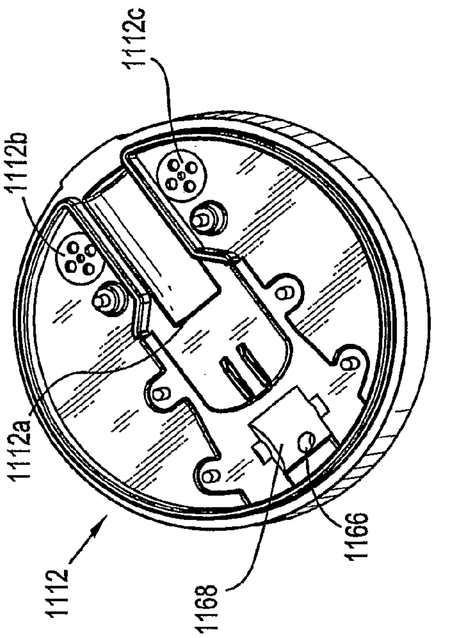
FIG. 42 is a top perspective view of a spout bottom lid of the top lid assembly of FIGS. 32-34.
Figure 43:
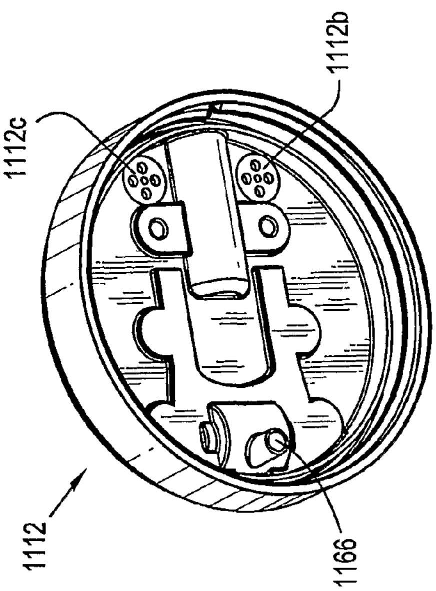
FIG. 43 is a bottom perspective view of the spout bottom lid of FIG. 42.
Figure 40:
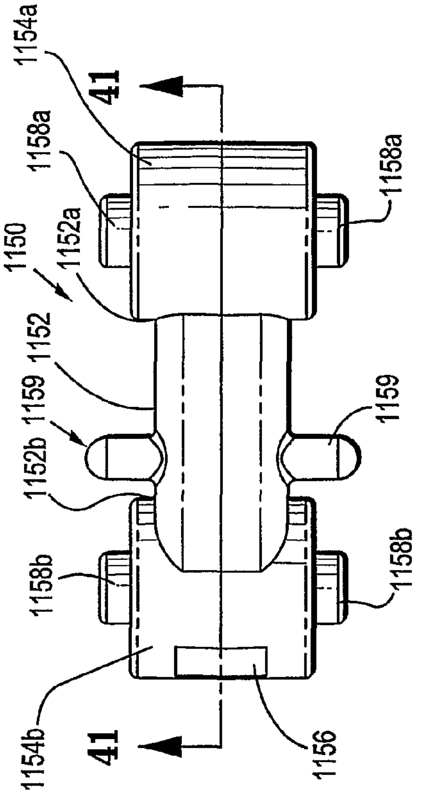
FIG. 40 is a top plan view of a straw stand of the top lid assembly of FIGS. 32-34.
Figure 41:
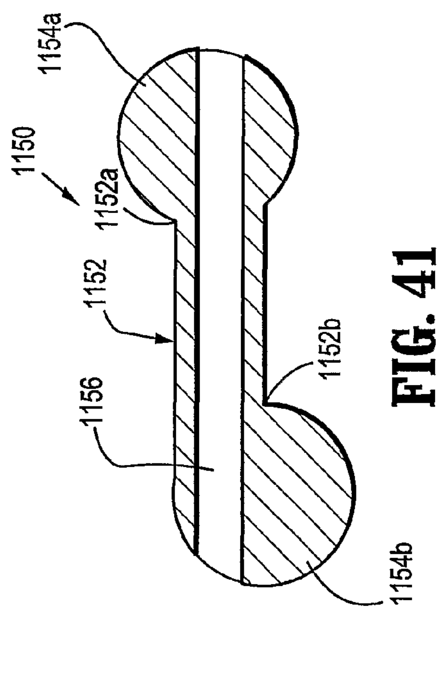
FIG. 41 is a cross-sectional view of the straw stand of FIG. 40, as taken through 41-41 of FIG. 40.
Figure 45:
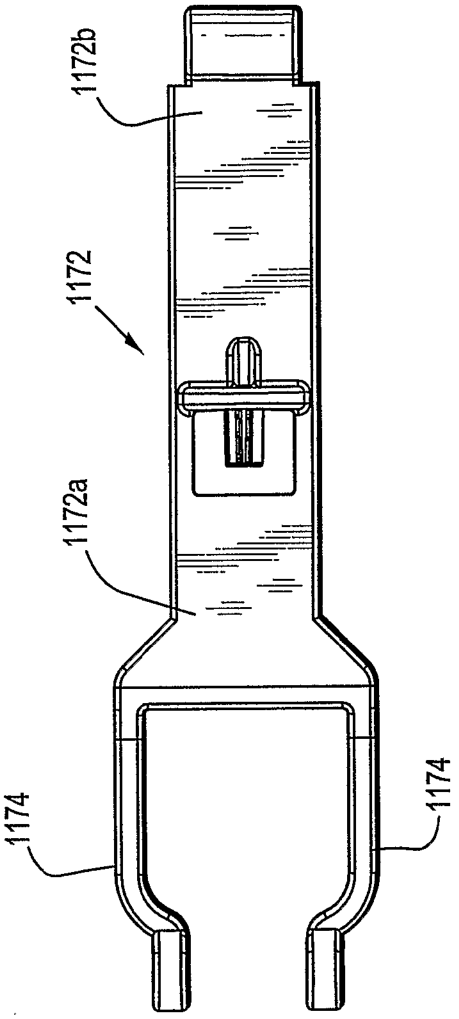
FIG. 45 is a bottom plan view of a spout driver of the top lid assembly of FIGS. 32-34.
Figure 46:
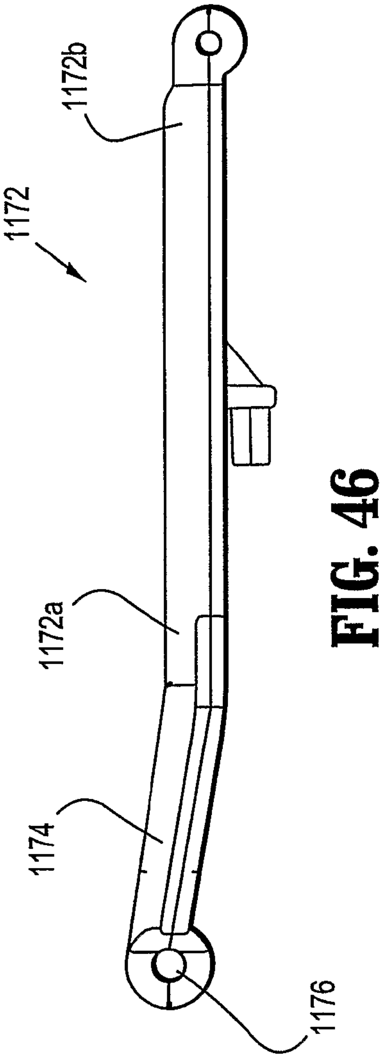
FIG. 46 is a side, elevational view of the spout driver of FIG. 45.
Figure 44:
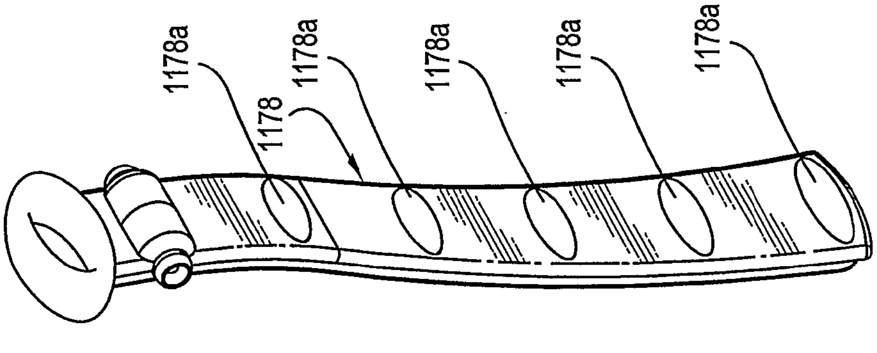
FIG. 44 is a perspective view of a spout trigger of the top lid assembly of FIGS. 32-34.

Turning now to FIGS. 34, 42 and 43, spout bottom lid 1112 includes a pair of venting regions 1112*b*, 1112*c* formed therein. Preferably, venting regions 1112*b*, 1112*c* include pores which extend through the surface of spout bottom lid 1112. Top lid assembly 1100 further includes a pair of umbrella valves 1113*b* and 1113*c* operatively associated with venting regions 1112*b*, 1112*c*, respectively. In particular, a first umbrella valve 1113*b* is positioned on an upper surface of venting region 1112*b* and a second umbrella valve 1113*c* is positioned on a bottom surface of venting region 1112*c*. In use, umbrella valves 1113*b*, 1113*c* cooperate with one another to provide venting into and out of cavity 1012 of body portion 1010 during charging, recharging, draining and/or emptying of bottle assembly 1000.

Figure 47:
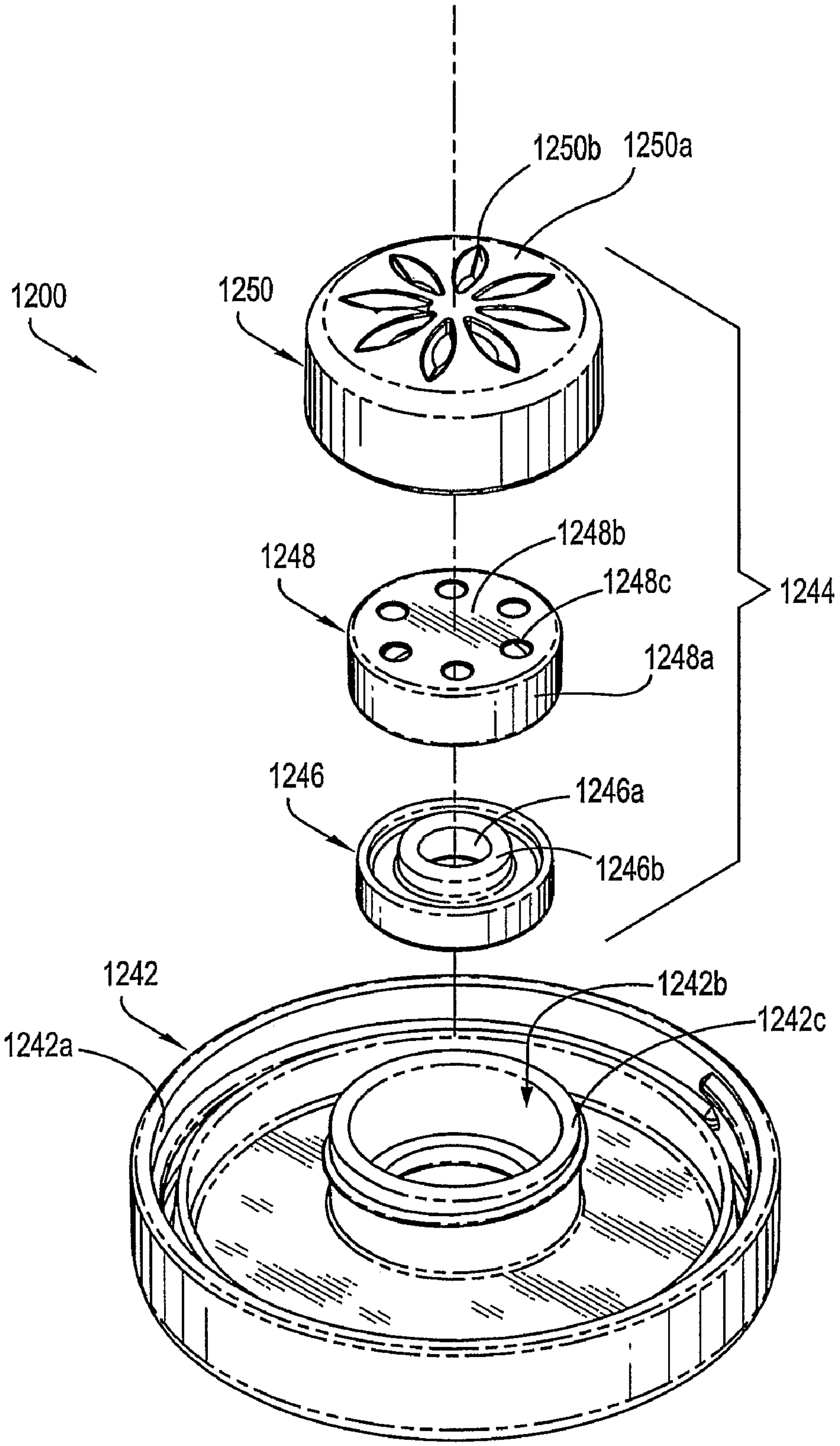
FIG. 47 is an exploded perspective view of a bottom lid assembly of the bottle assembly of FIGS. 30 and 31.
Figure 48:
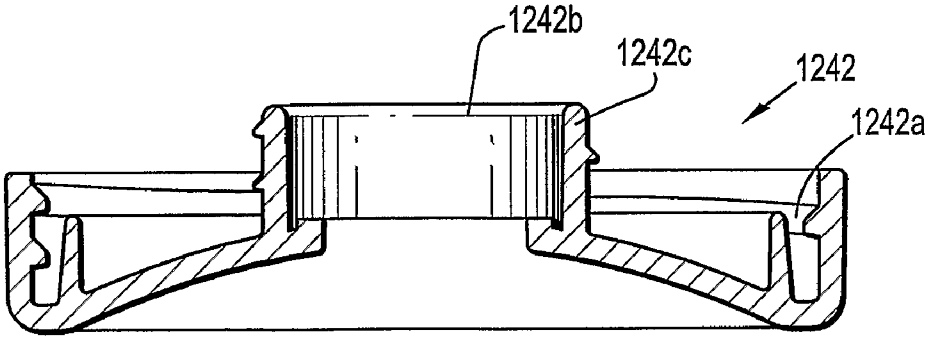
FIG. 48 is a longitudinal cross-sectional view of the bottom lid of FIG. 47.

Turning now to FIGS. 47 and 48, a detailed discussion of bottom lid assembly 1200 is provided. Bottom lid assembly 1200 is substantially similar to base assembly 540 and thus will only be described herein in detail to the extent necessary to identify differences in construction and operation.

Bottom lid assembly 1200 includes a bottom cover 1242 defining an annular channel 1242*a* configured and adapted to threadingly engage bottom rim 1014*b* of body portion 1010 in a fluid tight manner. Bottom cover 1242 defines a central opening 1242*b* formed therein.

Bottom lid assembly 1200 further includes a one-way valve assembly 1244 operatively connected to bottom cover 1242 and disposed over central opening 1242*b*. As will be described in greater detail below, one-way valve assembly 1244 enables passage of fluid into cavity 1012 of body portion 1010 and not out of cavity 1012 of body portion 1010. In particular, one-way valve assembly 1244 includes a valve insert 1246 which is disposed over or in central opening 1242*b* of bottom cover 1242 and which includes an opening 1246*a* therethrough defined by an inner annular wall 1246*b*. Desirably, valve insert 1246 is disposed within an annular rim 1242*c* extending from bottom cover 1242 and surrounding central opening 1242*b* thereof.

One-way valve assembly 1244 further includes a valve diaphragm 1248 operatively disposed over valve insert 1246. Valve diaphragm 1248 includes an annular wall 1248*a* and a membrane 1248*b* extending across annular wall 1248*a*. Membrane 1248*b* of valve diaphragm 1248 includes at least one aperture or window 1248*c* formed therein. Valve diaphragm 1248 is formed from an elastomeric material. Accordingly, when valve diaphragm 1248 is properly secured in position, membrane 1248*b* extends across inner annular wall 1246*b* of valve insert 1246. Desirably, each aperture 1248*c* of membrane 1248*b* is disposed radially outward of inner annular wall 1246*b* of valve insert 1246. When membrane 1248*b* is in contact with inner annular wall 1246*b* of valve insert 1246, a fluid tight seal is created therebetween. In order to break the fluid tight seal, membrane 1248*b* must be separated from inner annular wall 1246*b* of valve insert 1246.

One-way valve assembly 1244 further includes a valve cap 1250 configured and adapted to selectively engage annular rim 1242*c* of bottom cover 1242. Valve cap 1250 includes a top wall 1250*a* defining at least one aperture or window 1250*b* therein. Valve cap 1250 is configured and dimensioned such that top wall 1250*a* thereof is spaced a distance from annular wall 1246*b* of valve insert 1246.

In use, when a filling nipple, configured to deliver fluid, is introduced into central opening 1242*b* of bottom cover 1242 and fluid is forced out of the nipple, the fluid pressure acts on membrane 1248*b* thus separating membrane 1248*b* from annular wall 1246*b* of valve insert 1246 and permits fluid to flow between membrane 1248*b* and annular wall 1246*b*, through apertures 1248*c*, and out through apertures 1250*b* of valve cap 1250 into cavity 1012 of body portion 1010. Once the tip of the filling nipple is withdrawn and the fluid pressure is reduced and/or cut-off, membrane 1248*b* re-engages or returns into contact with annular wall 1246*b* of valve insert 1246 to once again create the fluid tight seal therebetween and prevent leakage of fluid from cavity 1012 of body portion 1010 back through one-way valve assembly 1240.

Figure 49:
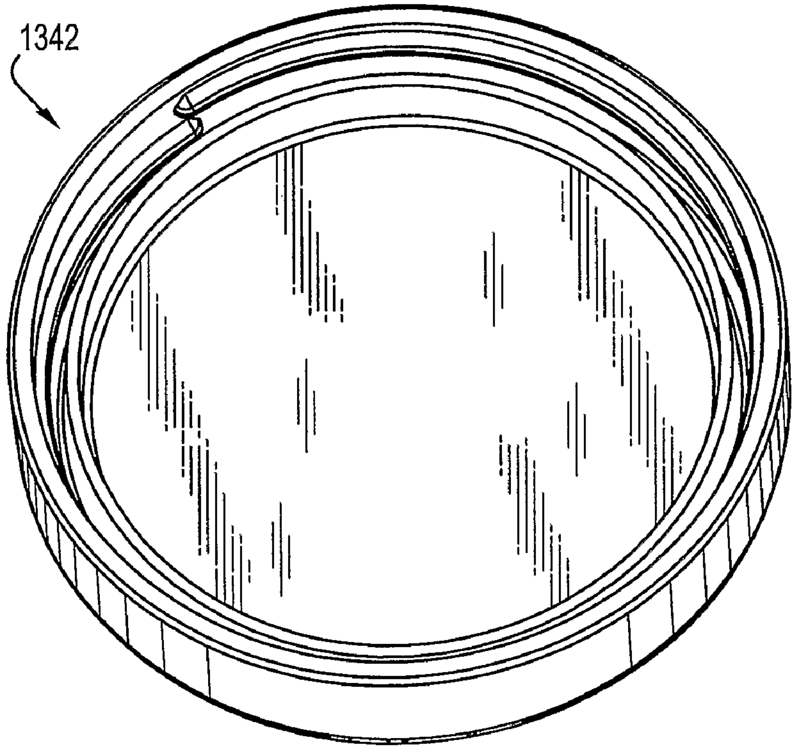
FIG. 49 is a perspective view of an alternate bottom lid for use with the bottle assembly of FIGS. 30 and 31.

As seen in FIG. 49, bottle assembly 1000 may include a bottom cover 1342 which does not include any apertures or openings formed in a center thereof.

While several particular forms of the charging/recharging system have been illustrated and described, it will also be apparent that various modifications can be made without departing from the spirit and scope of the present disclosure. Thus, it should be understood that various changes in form, detail and application of the charging/recharging system of the present disclosure may be made without departing from the spirit and scope of the present disclosure.

What is claimed is:

1. A fluid supply assembly fluidly connectable to a source of fluid, comprising:
- a housing;
- a hydraulic assembly supported within the housing, wherein the hydraulic assembly is configured and adapted to pressurize the fluid which is supplied to a fluid supply valve assembly;
- a tank assembly supported within the housing for retaining a quantity of pre-conditioned fluid therein; the tank assembly including:
  - an insulated housing defining a reservoir therein;
  - a screen disposed within the reservoir for dividing the reservoir into a first chamber and a second chamber;
  - a pair of first heat sinks extending into the first and second chambers of the reservoir;
  - a pair of second heat sinks provided on an exterior of the insulated housing: and
  - peltiers interconnecting the first and second heat sinks within one another: and
- a filter assembly supported within the housing and in fluid communication with the hydraulic assembly.

2. The fluid supply assembly according to claim 1, wherein the hydraulic assembly includes:
- a support body;
- a solenoid shut-off operatively disposed on the support body;
- a pressure regulator operatively associated with the solenoid shut-off; and a fluid supply line fluidly connected to the pressure regulator.

3. The fluid supply assembly according to claim 2, further comprising a solenoid filter in fluid communication with thesolenoid shut-off.

4. The fluid supply assembly according to claim 3, further comprising a fan plate assembly operatively associated with the tank assembly and being configured and adapted for maintaining the pre-conditioned fluid contained therein at a relatively low temperature.

5. The fluid supply assembly according to claim 4, wherein the fan plate assembly is operatively associated with the second heat sinks.

6. The fluid supply assembly according to claim 5, wherein the filter assembly includes:

a filter housing;

a sediment filter disposed within the filter housing; and a carbon-block filter disposed within the housing.

7. The fluid supply assembly according to claim 6, further comprising a display supported on the housing thereof, the display including a plurality of LEDs, and a printed circuit board operatively associated with each LED.

8. The fluid supply assembly according to claim 6 wherein the sediment filter and the carbon-block filter are replaceable.

9. The fluid supply assembly according to claim 6, wherein the sediment filter and the carbon-block filter are automatically replaceable.

10. The fluid supply assembly according to claim 9, further comprising a mechanism for automatically replacing at least one of the sediment filter and the carbon-block filter.

11. The fluid supply assembly according to claim 10, wherein the automatic filter replacement mechanism includes:

a first button actuatable by a user for closing a fluid supply valve which supplies fluid to the filter assembly and for activating a release mechanism which disconnected at least one of the sediment filter and the carbon-block filter from the filter housing; and a second button actuatable by the user, following replacement of at least one of the sediment filter and the carbon-block filter with at least one new sediment filter and carbon-block filter, which fluidly secures the at least one new sediment filter and carbon-block filter to the filter housing, opens the fluid supply valve which supplies fluid to the filter assembly, and resets a counter which monitors use of the filter assembly and alerts the user when a predetermined threshold level is reached.

12. The fluid supply assembly according to claim 1, wherein the filter assembly is replaceable.

13. The fluid supply assembly according to claim 1, further comprising a mounting bracket for connecting the housing of the fluid supply assembly to a supporting structure.

14. A fluid supply assembly connectable to a source of fluid, comprising:

a housing;

a hydraulic assembly supported within the housing, wherein the hydraulic assembly is configured and adapted to pressurize the fluid which is supplied to the fluid supply valve assembly, the hydraulic assembly including:

a support body;

a solenoid shut-off operatively disposed on the support body;

a pressure regulator operatively associated with the solenoid shut-off;

a fluid supply line fluidly connected to the pressure regulator; and a solenoid filter in fluid communication with the solenoid shut-off;

a tank assembly supported within the housing for retaining a quantity of pre-conditioned fluid therein, the tank assembly including:

an insulated housing defining a reservoir therein;

a screen disposed within the reservoir for dividing the reservoir into a first chamber and a second chamber;

a pair of first heat sinks extending into the first and second chambers of the reservoir;

a pair of second heat sinks provided on an exterior of the insulated housing; and peltiers interconnecting the first and second heat sinks within one another;

a filter assembly supported within the housing and in fluid communication with the hydraulic assembly, the filter assembly including:

a filter housing;

a sediment filter disposed within the filter housing; and a carbon-block filter disposed within the housing;

a fan plate assembly operatively associated with the second heat sinks of the tank assembly and being configured and adapted for maintaining the pre-conditioned fluid contained therein at a relatively low temperature.

15. The fluid supply assembly according to claim 14, further comprising a display supported on the housing thereof, the display including a plurality of LEDs, and a printed circuit board operatively associated with each LED.

16. The fluid supply assembly according to claim 14, wherein the sediment filter and the carbon-block filter are replaceable.

17. The fluid supply assembly according to claim 14, wherein the sediment filter and the carbon-block filter are automatically replaceable.

18. The fluid supply assembly according to claim 17, further comprising a mechanism for automatically replacing at least one of the sediment filter and the carbon-block filter.

19. The fluid supply assembly according to claim 18, wherein the automatic filter replacement mechanism includes:

a first button actuatable by a user for closing a fluid supply valve which supplies fluid to the filter assembly and for activating a release mechanism which disconnected at least one of the sediment filter and the carbon-block filter from the filter housing: and a second button actuatable by the user, following replacement of at least one of the sediment filter and the carbon-block filter with at least one new sediment filter and carbon-block filter, which fluidly secures the at least one new sediment filter and carbon-block filter to the filter housing, opens the fluid supply valve which supplies fluid to the filter assembly and resets a counter Which monitors use of the filter assembly and alerts the user when a predetermined threshold level is reached.

20. The fluid supply assembly according to claim 14, wherein the filter assembly is replaceable.

* * * * *